(12) United States Patent
Yamaji et al.

(10) Patent No.: US 11,106,507 B2
(45) Date of Patent: Aug. 31, 2021

(54) MANAGEMENT APPARATUS, MANAGEMENT SYSTEM, MANAGEMENT METHOD, AND MANAGEMENT PROGRAM

(71) Applicant: OMRON Corporation, Kyoto (JP)

(72) Inventors: Yusuke Yamaji, Kyoto (JP); Takayuki Eda, Kyoto (JP); Hiroshi Imai, Kyoto (JP); Tanichi Ando, Komaki (JP); Tetsuji Yamato, Kyoto (JP); Koji Takizawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 143 days.

(21) Appl. No.: 16/081,914

(22) PCT Filed: Jan. 27, 2017

(86) PCT No.: PCT/JP2017/002948
§ 371 (c)(1),
(2) Date: Sep. 2, 2018

(87) PCT Pub. No.: WO2017/150029
PCT Pub. Date: Sep. 8, 2017

(65) Prior Publication Data
US 2019/0079802 A1 Mar. 14, 2019

(30) Foreign Application Priority Data
Mar. 3, 2016 (JP) .............................. JP2016-041418

(51) Int. Cl.
*G06F 9/46* (2006.01)
*G06F 9/50* (2006.01)
(Continued)

(52) U.S. Cl.
CPC .............. *G06F 9/5061* (2013.01); *G06F 9/50* (2013.01); *G06F 9/5005* (2013.01);
(Continued)

(58) Field of Classification Search
None
See application file for complete search history.

(56) References Cited

U.S. PATENT DOCUMENTS 8,522,341 B2 * 8/2013 Nochta ................ G06F 9/5044
726/20
9,872,125 B2 * 1/2018 Kami .................... H04W 24/10
(Continued)

FOREIGN PATENT DOCUMENTS

JP 2003-122796 A 4/2003
JP 2005-31826 A 2/2005
(Continued)

OTHER PUBLICATIONS

Obayashi et al., "Secured Cooperative Multi-Agent System in Limited Resources for Intelligent Sensor Network", 2005, IEEE, pp. 2668-2673. (Year: 2005).*
(Continued)

*Primary Examiner* — Kenneth Tang
(74) *Attorney, Agent, or Firm* — Metrolex IP Law Group, PLLC

(57) ABSTRACT

A coordinator (10) includes an accepting unit (11), a required resource information calculation unit (13a), an insufficient resource information calculation unit (13b), a combination determination unit (14), and a communication unit (18). The required resource information calculation unit (13a) calculates information regarding resources required to satisfy a request accepted by the accepting unit (11). The insufficient resource information calculation unit (13b) compares the required resources calculated by the required resource information calculation unit (13a) with resources included in each of a plurality of sensor nodes (30, 40, 50), and calculates information regarding an insufficient resource that each sensor node lacks. The combination determination unit (14) determines a combination of resources required to
(Continued)

satisfy the request, based on the information regarding the insufficient resource calculated by the insufficient resource information calculation unit (13b).

20 Claims, 28 Drawing Sheets

(51) Int. Cl.
  *G06F 13/00* (2006.01)
  *H04L 29/08* (2006.01)
(52) U.S. Cl.
  CPC .......... *G06F 9/5027* (2013.01); *G06F 9/5038* (2013.01); *G06F 9/5044* (2013.01); *G06F 9/5055* (2013.01); *G06F 13/00* (2013.01); *H04L 67/12* (2013.01); *G06F 2209/503* (2013.01); *G06F 2209/508* (2013.01)

(56) References Cited

U.S. PATENT DOCUMENTS

| | | | |
|---|---|---|---|
| 2004/0249563 A1* | 12/2004 | Otsuki | G05B 19/042 |
| | | | 701/454 |
| 2004/0249590 A1* | 12/2004 | Ota | G01D 9/005 |
| | | | 702/79 |
| 2005/0021296 A1 | 1/2005 | Aritsuka et al. | |
| 2006/0271661 A1* | 11/2006 | Qi | H04L 41/0823 |
| | | | 709/223 |
| 2007/0073861 A1 | 3/2007 | Amanuddin et al. | |
| 2007/0233881 A1 | 10/2007 | Nochta et al. | |
| 2009/0138542 A1* | 5/2009 | Sakai | G06F 13/387 |
| | | | 709/201 |
| 2013/0260783 A1* | 10/2013 | Agrawal | H04L 67/12 |
| | | | 455/456.1 |
| 2014/0372561 A1* | 12/2014 | Hisano | G08G 1/0112 |
| | | | 709/217 |
| 2015/0134954 A1* | 5/2015 | Walley | H04L 63/0823 |
| | | | 713/168 |
| 2017/0063566 A1* | 3/2017 | Seminario | H04L 12/2816 |
| 2017/0070933 A1* | 3/2017 | Hagiwara | H04W 4/70 |
| 2017/0251471 A1* | 8/2017 | Jeong | H04W 52/0216 |
| 2017/0284839 A1* | 10/2017 | Ojala | H04L 67/12 |
| 2018/0152391 A1* | 5/2018 | Huh | H04L 67/303 |
| 2018/0295550 A1 | 10/2018 | Hagiwara et al. | |
| 2019/0075500 A1 | 3/2019 | Hagiwara et al. | |

FOREIGN PATENT DOCUMENTS

| | | |
|---|---|---|
| JP | 2007-193748 A | 8/2007 |
| JP | 2009-507441 A | 2/2009 |
| JP | 2009-146384 A | 7/2009 |
| JP | 2011118950 A | 6/2011 |
| JP | 2014190959 A | 10/2014 |
| JP | 2014-211868 A | 11/2014 |
| WO | 2015/174058 A1 | 11/2015 |
| WO | WO-2016036612 A1 * | 3/2016 ............. H04L 67/12 |

OTHER PUBLICATIONS

The Written Opinion of PCT/JP2017/002948 dated Apr. 11, 2017.
The English translation of the International preliminary report on patentability (IPRP) of PCT/JP2017/002948 dated Sep. 13, 2018.
An English translation of the International Search Report of PCT/JP2017/002948 dated Apr. 11, 2017.
The Office Action dated Mar. 10, 2020 in a counterpart Japanese patent application.
Thomas Renner et al: "The Device Cloud—Applying Cloud Computing Concepts to the Internet of Things", 2014 IEEE 11th Intl Conf on Ubiquitous Intelligence and Computing and 2014 IEEE 11th Intl Conf on Autonomic and Trusted Computing and 2014 IEEE 14th Intl Conf on Scalable Computing and Communications and Associated Symposia/Workshops, Dec. 9, 2014, pp. 396-401.
The extended European search report dated Oct. 11, 2019 in a counterpart European patent application.

* cited by examiner

Fig.10

| Task Category | | Task No. [1 byte] | Priority [1 byte] | Status [1 byte] | App. No. [1 byte] | Start Time [4 byte] | Cycle [4 byte] |
|---|---|---|---|---|---|---|---|
| Measurement | Temperature | 0x01 | 0x01 | 0x01 | 0x01 | 0x00000012 | 0x00000BB8 |
| | | 0x02 | 0x09 | 0x01 | 0x02 | 0x00000015 | 0x00000258 |
| | | 0x03 | 0x0A | 0x00 | 0x03 | 0xFFFFFFFF | 0x00000258 |
| | | ... | ... | ... | ... | ... | ... |
| | Acceleration | 0x04 | 0x04 | 0x00 | 0x11 | 0xFFFFFFFF | 0x0008CA0 |
| | | 0x05 | 0x02 | 0x01 | 0x01 | 0x00000013 | 0x00000BB8 |
| | | ... | ... | ... | ... | ... | ... |
| Data Processing | Ave. | 0x06 | 0x0B | 0x00 | 0x11 | 0xFFFFFFFF | 0x0008CA0 |
| | FFT | 0x07 | 0x07 | 0x01 | 0x20 | 0x00000022 | 0x00000BB8 |
| | | ... | ... | ... | ... | ... | ... |
| Transmission Of Sensing Data | Transmission | 0x08 | 0x03 | 0x01 | 0x01 | 0x00000014 | 0x00000BB8 |
| | | 0x0B | 0x08 | 0x01 | 0x20 | 0x00000023 | 0x00000BB8 |
| | | ... | ... | ... | ... | ... | ... |
| Temporary Storage Of Sensing Data From Other Sensor Nodes | Temporary Storage | 0x09 | 0x05 | 0x01 | 0x20 | 0x00000020 | 0x00000BB8 |
| | | 0x0A | 0x06 | 0x01 | 0x20 | 0x00000021 | 0x00000BB8 |
| | | ... | ... | ... | ... | ... | ... |

Fig.11(a)

Sensor node NO. Table

| Serial No. | Sensor Node No. | Position | Network ID |
|---|---|---|---|
| 1 | 1 | GPS Information | A |
| 2 | 2 | GPS Information | A |
| 3 | 3 | GPS Information | A |
| 4 | 6 | GPS Information | F |
| ... | ... | ... | ... |

Fig.11(b)

Attribute ID Table

| Serial No. | Attribute ID | Description [text] |
|---|---|---|
| 1 | SEN | Sensing |
| 2 | MEM | Memory |
| 3 | DPRO | Data Processing |
| 4 | NWK | Network |
| ... | ... | ... |

Fig.12

Sensor Node Resource Management Table (Hold All Resource Management Tables Held For Respective Sensor Nodes)

| Task Category | Task No. [1 byte] | Priority [1 byte] | Status [1 byte] | App. No. [1 byte] | Start Time [4 byte] | Cycle [4 byte] |
|---|---|---|---|---|---|---|
| Measurement Temperature | 0x01 | 0x01 | 0x01 | 0x01 | 0x00000012 | 0x00000888 |
| Measurement Temperature | 0x02 | 0x09 | 0x01 | 0x02 | 0x00000015 | 0x00000258 |
| Measurement Temperature | 0x03 | 0x0A | 0x00 | 0x03 | 0xFFFFFFFF | 0x00000258 |
| ... | ... | ... | ... | ... | ... | ... |
| Data Processing Acceleration Ave. | 0x04 | 0x02 | 0x00 | 0x11 | 0xFFFFFFFF | 0x00000CA0 |
| Data Processing FFT | 0x05 | 0x02 | 0x01 | 0x01 | 0x00000013 | 0x00000888 |
| ... | ... | ... | ... | ... | ... | ... |
| Transmission Of Sensing Data | 0x06 | 0x0B | 0x00 | 0x11 | 0xFFFFFFFF | 0x00000CA0 |
| Transmission Of Sensing Data | 0x07 | 0x07 | 0x01 | 0x20 | 0x00000022 | 0x00000888 |
| ... | ... | ... | ... | ... | ... | ... |
| Temporary Storage Of Sensing Data From Other Sensor Nodes | 0x08 | 0x03 | 0x01 | 0x01 | 0x00000014 | 0x00000888 |
| Temporary Storage Of Sensing Data From Other Sensor Nodes | 0x08 | 0x08 | 0x01 | 0x20 | 0x00000023 | 0x00000888 |
| Temporary Storage Of Sensing Data From Other Sensor Nodes | 0x09 | 0x05 | 0x01 | 0x20 | 0x00000020 | 0x00000888 |
| Temporary Storage Of Sensing Data From Other Sensor Nodes | 0x0A | 0x06 | 0x01 | 0x20 | 0x00000021 | 0x00000888 |

Fig.14(a)

| Sensor Node No. 1 | |
|---|---|
| Sensing | Power(W), Power Factor |
| Memory | 5kB |
| Data Processing | Encryption(AES128) |
| Network | 10kbps |

Fig.14(b)

| Sensor Node No. 2 | |
|---|---|
| Sensing | Temperature(°C), Humidity(%RH), Illuminance(lx) |
| Memory | 3kB |
| Data Processing | non |
| Network | 10kbps |

Fig.14(c)

| Sensor Node No. 3 | |
|---|---|
| Sensing | Tilt(°), Three-Axis Acceleration(m/s$^2$), Weight(kg) |
| Memory | 1kB |
| Data Processing | non |
| Network | 10kbps |

Fig.15

Message Frame

| | Data Header | | | Data Payload | | Checksum for Data Payload | Terminal Symbol for Data |
|---|---|---|---|---|---|---|---|
| Start Symbol for Data | Destination Address | Length of Data | Checksum for Data Header | Data Type ID | Data Entity | | |

| | | | | Data Type ID | | | |
|---|---|---|---|---|---|---|---|
| Byte | 1 | 2 | 1 | 1 | 0 or 1 | 0 to 253 | 0 or 1 | 1 |
| Value | 0x02 | Final Address Of Message (Address Of Coordinator Etc.) | Byte Length Of Data Payload + Checksum For Data Payload | Sum Of Byte Sequence Of Destination Address And Length Of Data | | 0 to 255 | Sum Of Byte Sequence Of Data Type Id And Data Entity | 0x03 |
| | | | | | | Data Acquired By Sensor | | |

Data Entity

| | Source Address | Application ID | Sensor Data ID | Sensor Data | ... | Application ID | Sensor Data ID | Sensor Data |
|---|---|---|---|---|---|---|---|---|
| Byte | 2 | 1 | 1 | 4 | ... | 1 | 1 | 20 |
| Value | Message Transmission Source Address | Application ID | Sensor Data Identifier | Data Acquired By Sensor | ... | Application ID 0xFF | Attribute ID | Attribute Data |

| | | | |
|---|---|---|---|
| | | 0 to 253 | |

Data Type ID

0x01: Transmission From Sensor Node To Coordinator, No Resource Table Information Available
0x02: Transmission From Sensor Node To Coordinator, Resource Table Information Available
0x10: Transmission From Coordinator To Sensor Node (Command From Coordinator)
0x00: Broadcast

Application ID

0x01~0xFE : reserved
0xFF: Providable Resource Information
* In Case Of 0xFF,
 - Attribute ID In Resource DB Is Stored As Sensor Data ID.
 - Data Of Each Attribute ID Is Stored As Sensor Data.
 * Data is text and its size is up to 20 bytes, as an example.

Fig.16

| Calculated Required Resources | Acceleration Of Sensor Node No.=3 |
|---|---|
| Sensing | |
| Memory | 6kB |
| Data Processing | non |
| Network | 0.16kbps |

Fig.17

| Feasibility Evaluation | Acceleration Of Sensor Node No.=3 | |
|---|---|---|
| Sensing | | OK |
| Memory | 6kB | 5 kB Lacking |
| Data Processing | non | OK |
| Network | 0.16kbps | OK |

Fig.19

| Message Frame | | | | | | | | | |
|---|---|---|---|---|---|---|---|---|---|
| Start Symbol | Data Header | | | | | | Data Payload | | Terminal Symbol |
| | Length of Destination Address | Destination Address | Length of Source Address | Source Address | Length of Data | Checksum for Data Header | Data Type ID | Data Entity | |
| Byte | 4 | 1 | 0 to 255 | 1 | 0 to 255 | 2 | 1 | 1 | 0 to 65533 | 1 | 4 |
| Value | 0xA5 0xA5 0xA5 0x02 | Byte Length Of Final Address Of Message | Final Address Of Message (Short Address 8bit Or Extended Address 64bit) | Byte Length Of Source Address | Address Of Relay Node That Is A Path For Message, And Address Of Coordinator | Byte Length Of Data Payload | Sum of byte sequence of destination address and length of data | Data entity Identifier 0x10 | Command | Sum Of Byte Sequence Of Data Type ID And Data Entity | 0xA5 0xA5 0xA5 0x03 |

| | | | 0 to 65535 | |

| Data Entity | |
|---|---|
| Command Code | Command Data |
| Byte | 1 | 0 to 65532 |
| Value | Command | Data Required To Execute Command |

Data Type ID

0x01: Transmission From Sensor Node To Coordinator, No Resource Table Information Available
0x02: Transmission From Sensor Node To Coordinator, Resource Table Information Available
0x10: Transmission From Coordinator To Sensor Node (Command From Coordinator)
0x00: Broadcast

Application ID

0x01~0xFE: reserved
0xFF: Providable Resource Information
* In Case Of 0xFF,
 - Attribute ID Of Resource DB Is Stored As Sensor Data ID.
 - Data Of Each Attribute ID Is Stored As Sensor Data.
 * Data is text and its size is up to 20 bytes, as an example.

Fig.23(a)

| Sensor Node No.1 | |
|---|---|
| Sensing | Three-Axis Acceleration |
| Memory | 49.5kB |
| Data Processing | non |
| Network | 10kbps |

Fig.23(b)

| Sensor Node No. 2 | |
|---|---|
| Sensing | Three-Axis Acceleration |
| Memory | 40kB |
| Data Processing | FFT |
| Network | 10kbps |

Fig.24

| Calculated Required Resources | Acceleration Of Sensor Node No.=1 |
|---|---|
| Sensing | |
| Memory | 30kB |
| Data Processing | FFT |
| Network | 0.8kbps |

Fig.25

| Feasibility Evaluation | Acceleration Of Sensor Node No.=1 | |
|---|---|---|
| Sensing | | OK |
| Memory | 30kB | OK |
| Data Processing | FFT | FFT Lacking |
| Network | 0.8kbps | OK |

MANAGEMENT APPARATUS, MANAGEMENT SYSTEM, MANAGEMENT METHOD, AND MANAGEMENT PROGRAM

TECHNICAL FIELD

The present invention relates to a management apparatus, management system, management method, and management program with which a request input from outside is satisfied by providing resources included in a plurality of sensor nodes, for the request.

BACKGROUND ART

In recent years, IoT, Trillion Sensors, and the like have been proposed, and a world is being realized where a large number of sensor nodes installed in society are connected to the Internet.

These sensor nodes have a variety of software and hardware resources and exhibit various performance capabilities according to uses, but not all performance capabilities of the sensor nodes are fully used. That is to say, the hardware and software resources included in these sensor nodes are optimized (restricted) for respective purposes and uses envisioned for the purposes.

For example, Patent Literature 1 discloses an information processing apparatus that receives and displays functions of an external apparatus connected via a network, and causes the external apparatus to perform a function selected from a displayed list of functions by a user.

Patent Literature 2 discloses a communication system in which a plurality of apparatuses can communicate with each other, information regarding devices that constitute each of the apparatuses is shared, and the devices in each apparatus are managed so as to distribute the load on the devices.

CITATION LIST

Patent Literature

Patent Literature 1: JP 2009-146384A
Patent Literature 2: JP 2014-211868A

SUMMARY OF INVENTION

Technical Problem

However, the conventional apparatus and system have the following problems.

That is to say, with the information processing apparatus disclosed in Patent Literature 1, the user needs to manually select a function to perform from the displayed function list, in accordance with the user's need. In addition, in the case of the above information processing apparatus, there may be a case where a plurality of external apparatuses need to cooperate with each other to realize the function required for the user's need, but the information processing apparatus is not provided with a function of adjusting the method for this cooperation. It is therefore difficult to satisfy the user's need that can be realized by combining a plurality of resources included in a plurality of external apparatuses.

In the communication system disclosed in Patent Literature 2, operations performed between a plurality of apparatuses are means for realizing the purpose, namely load distribution. For this reason, if there is another purpose (need), it is difficult to adjust operations of the devices of the plurality of apparatuses so as to achieve this purpose.

An object of the present invention is to provide a management apparatus, management system, management method, and management program with which various needs can be satisfied by combining resources included in a plurality of sensor nodes.

Solution to Problem

A management apparatus according to a first aspect of the invention is a management apparatus that satisfies a request input from outside by causing resources included in a plurality of sensor nodes to be provided for the request, and includes an accepting unit, a resource information acquisition unit, a required resource information calculation unit, an insufficient resource information calculation unit, a combination determination unit, and a communication unit. The accepting unit accepts the request. The resource information acquisition unit acquires information regarding the resources included in the plurality of sensor nodes. The required resource information calculation unit calculates information regarding resources required to satisfy the request accepted by the accepting unit. The insufficient resource information calculation unit compares the required resources calculated by the required resource information calculation unit with resources included in each of the plurality of sensor nodes, and calculates information regarding an insufficient resource that each of the sensor nodes lacks. The combination determination unit determines a combination of resources required to satisfy the request, based on the information regarding the insufficient resource calculated by the insufficient resource information calculation unit. The communication unit transmits a command to cause a plurality of sensor nodes that include the required resources to provide the required resources, based on the combination determined by the combination determination unit.

Here, even if various unexpected needs (requests) are given, the information regarding the resources included in the plurality of sensor nodes is acquired, and a function that cannot be realized with one sensor node is realized by combining resources included in the plurality of sensor nodes.

Here, the request input from outside may be, for example, a request that is directly input by a user, or may be a request that is input from an external apparatus, an external system, or the like.

A sensor node may be, for example, an apparatus in which various sensors, a data processing function, a data communication function, a memory function, and so on, are mounted on a substrate. Various sensors included in a sensor node may be various sensors for measuring physical quantities, such as an acceleration sensor, a voltage sensor, a current sensor, a temperature sensor, a humidity sensor, an illuminance sensor, a weight sensor, a motion sensor, a contact sensor, and a pressure sensor. The data processing function included in a sensor node may be, for example, FFT (Fast Fourier transform), encryption processing, or the like. Furthermore, the data communication function included in a sensor node may be, for example, wireless communication (ZigBee (registered trademark), Bluetooth (registered trademark) etc.), or wireless communication (wireless LAN etc.) or wired communication (LAN etc.) in which communication is enabled via an IP network or the like. Furthermore, the memory function included in a sensor node may be a RAM (Random Access Memory), a ROM (Read Only Memory), or the like in which sensor data can be stored.

The information (resource information) regarding resources acquired by the resource information acquisition unit is resource information provided by the plurality of sensor nodes, and is information regarding resources that can be used for uses that differ from the original uses of the individual sensor nodes, for example. It is favorable that the resource information is always updated to the latest information by being regularly acquired from the respective sensor nodes.

The required resource information calculated by the required resource information calculation unit may be calculated using the resource information acquired by the resource information acquisition unit as-is, or may be calculated using resource information that is retrieved from a storage unit, an external server, a cloud system, or the like in which the resource information acquired by the resource information acquisition unit is temporarily stored.

The insufficient resource information calculated by the insufficient resource information calculation unit refers to information regarding insufficient resources for a request that cannot be executed with a single sensor node.

The combination determination unit determines a combination that enables the request that cannot be executed with a single sensor node to be realized, by combining resources included in the plurality of sensor nodes. The combination determination unit may determine one or more resource combinations. For example, if a plurality of combinations are listed, the best combination that meets various conditions may be selected.

The management apparatus may be provided in a location that differs from the locations of the sensor nodes, or may be provided in a specific sensor node, as long as the management apparatus can communicate with the plurality of sensor nodes.

Thus, for example, even if a request is input that cannot be realized only with resources included in any one of the plurality of sensor nodes, the request can be readily realized by using resources included in the plurality of sensor nodes while effectively combining these resources.

As a result, no new sensor node needs to be installed to satisfy the request, and various needs can be satisfied by combining the existing sensor nodes.

A management apparatus according to a second aspect of the invention is the management apparatus according to the first aspect of the invention further including a storage unit for storing information regarding the request accepted by the accepting unit, and the information regarding the resources acquired by the resource information acquisition unit.

Here, the storage unit for storing request information input from outside and the resource information that the sensor nodes have is provided within the management apparatus.

Information to be stored in the storage unit may also include information other than the aforementioned request information and resource information, e.g. it may include the required resource information, insufficient resource information, combination results, or the like.

Thus, an optimum combination of sensor nodes (resources) can be determined for the request information input from outside, using the resource information stored in the management apparatus.

As a result of the resource information of the sensor nodes being temporarily stored in the management apparatus, when request information is received, a combination that enables the request to be realized can be determined using the latest resource information.

A management apparatus according to a third aspect of the invention is the management apparatus according to the first or second aspect of the invention in which the resource information acquisition unit regularly acquires latest resource information from the plurality of sensor nodes.

Here, the resource information acquisition unit receives the latest resource information from the plurality of sensor nodes.

Thus, for example, even if a sensor node to be managed by the management apparatus is added or removed, a combination of resources for the request input from outside can be determined using the latest resource information.

A management apparatus according to a fourth aspect of the invention is the management apparatus according to any one of the first to third aspects of the invention in which the information regarding the resources (resource information) includes at least one of a type, a storage capacity of a memory, data processing capability, a communication method, communication performance, and power supply information of a sensor included in each sensor node.

Here, the type of sensor, storage capacity of a memory, data processing capability, communication method, communication performance, power supply information, or the like are used as the resource information.

Thus, an optimum resource combination can be determined while giving consideration to the type of sensor, memory capacity, data processing capability, communication capability, or the like that are required for the request input from outside.

A management apparatus according to a fifth aspect of the invention is the management apparatus according to any one of the first to fourth aspects of the invention in which the combination determination unit calculates a plurality of combinations of resources required to satisfy the request.

Here, a plurality of combinations are obtained that meet conditions required for the request input from outside.

Thus, a more optimum resource combination can be determined by further adding conditions, from the resource combinations that meet the conditions. As a result, the request input from outside can be accurately realized in a high-quality manner.

A management apparatus according to a sixth aspect of the invention is the management apparatus according to the fifth aspect of the invention in which the combination determination unit determines the combination of the resources included in the command transmitted from the communication unit, from the plurality of obtained combinations of the resources, based on at least one of availability of the resources, the number of resources required in the combination, and a communication speed between the sensor nodes.

Here, if a plurality of combinations are listed, for example, selection is made while giving priority to a combination with lower availability of resources, a combination with a lower number of required resources, and a combination with a higher communication speed.

By thus selecting a more favorable resource combination from the combinations that realize the request, the request input from outside can be accurately realized in a high-quality manner.

A management apparatus according to a seventh aspect of the invention is the management apparatus according to any one of the first to sixth aspects of the invention in which the insufficient resource information calculation unit calculates information regarding at least one of a type, capacity, performance, and time of the required resources.

Here, if the request cannot be realized with resources in a specific sensor node, the type, capacity, performance, time, or the like of the required resources is used as the information regarding the insufficient resource.

Thus, for example, if a specific amount of a specific type of resource is required in a specific time period, the other sensor nodes that include resources that meet these conditions can be searched.

A management system according to an eighth aspect of the invention includes the management apparatus according to any one of the first to sixth aspects of the invention, and the plurality of sensor nodes.

Here, a system is configured that includes the above-described management apparatus, and a plurality of sensor nodes capable of communicating with the management apparatus.

Thus, as mentioned above, even if, for example, a request is input that cannot be realized only with resources included in any one of the plurality of sensor nodes, the request can be readily realized by using the resources included in the plurality of sensor nodes while effectively combining these resources.

As a result, no new sensor node needs to be installed to satisfy the request, and various needs can be satisfied by combining the existing sensor nodes.

A management system according to a ninth aspect of the invention is the management system according to the eighth aspect of the invention further including a storage unit for storing the information regarding the resources acquired by the resource information acquisition unit.

Here, the storage unit for storing information (resource information) regarding resources is provided, separately from the management apparatus, within the system. Thus, an optimum combination of sensor nodes (resources) can be determined for request information input from outside, using the resource information stored in the storage unit provided within the management apparatus.

As a result of the resource information of the sensor nodes being temporarily stored in the storage unit in the management apparatus, when request information is received, a combination that enables the request to be realized can be determined using the latest resource information.

A management method according to a tenth aspect of the invention is a management method for satisfying a request input from outside by causing resources included in a plurality of sensor nodes to be provided for the request, and includes an accepting step, a resource information acquisition step, a required resource information calculation step, an insufficient resource information calculation step, a combination determination step, and a communication step. In the accepting step, the request is accepted. In the resource information acquisition step, information regarding the resources included in the plurality of sensor nodes is acquired. In the required resource information calculation step, information regarding resources required to satisfy the request accepted in the accepting step is calculated. In the insufficient resource information calculation step, the required resources calculated in the required resource information calculation step is compared with resources included in each of the plurality of sensor nodes, and information regarding an insufficient resource that each of the sensor nodes lacks is calculated. In the combination determination step, a combination of resources required to satisfy the request is determined, based on the information regarding the insufficient resource calculated in the insufficient resource information calculation step. In the communication step, a command to cause the plurality of sensor nodes that include the required resources to provide the required resources is transmitted, based on the combination determined in the combination determination step.

Here, even if various unexpected needs (requests) are given, the information regarding the resources included in the plurality of sensor nodes is acquired, and a function that cannot be realized with one sensor node is realized by combining resources included in the plurality of sensor nodes.

Here, the request input from outside may be, for example a request that is directly input by a user, or may be a request that is input from an external apparatus, an external system, or the like.

A sensor node may be, for example, an apparatus in which various sensors, a data processing function, a data communication function, a memory function, and so on, are mounted on a substrate. Various sensors included in a sensor node may be various sensors for measuring physical quantities, such as an acceleration sensor, a voltage sensor, a current sensor, a temperature sensor, a humidity sensor, an illuminance sensor, a weight sensor, a motion sensor, a contact sensor, and a pressure sensor. The data processing function included in a sensor node may be, for example, FFT (Fast Fourier transform), encryption processing, or the like. Furthermore, the data communication function included in a sensor node may be, for example, wireless communication (ZigBee (registered trademark), Bluetooth (registered trademark) etc.), or wireless communication (wireless LAN etc.) or wired communication (LAN etc.) in which communication is enabled via an IP network or the like. Furthermore, the memory function included in a sensor node may be a RAM (Random Access Memory), a ROM (Read Only Memory), or the like in which sensor data can be stored.

The information (resource information) regarding resources acquired by the resource information acquisition step is resource information provided by the plurality of sensor nodes, and is information regarding resources that can be used for uses that differ from the original uses of the individual sensor nodes, for example. It is favorable that the resource information is always updated to the latest information by being regularly acquired from the respective sensor nodes.

The required resource information calculated in the required resource information calculation step may be calculated using the resource information acquired in the resource information acquisition step as-is, or may be calculated using resource information that is retrieved from a storage unit, external server, cloud system, or the like in which the resource information acquired in the resource information acquisition step is temporarily stored.

The insufficient resource information calculated in the insufficient resource information calculation step refers to information regarding insufficient resources for a request that cannot be executed with a single sensor node.

In the combination determination step, a combination is determined that enables the request that cannot be executed with a single sensor node to be realized, by combining resources included in the plurality of sensor nodes. One or more resource combinations may be determined in the combination determination step. For example, if a plurality of combinations are listed, the best combination that meets various conditions may be selected.

The management apparatus may be provided in a location that differs from the locations of the sensor nodes, or may be provided in a specific sensor node, as long as the management apparatus can communicate with the plurality of sensor nodes.

Thus, for example, even if a request is input that cannot be realized only with resources included in any one of the plurality of sensor nodes, the request can be readily realized by using resources included in the plurality of sensor nodes while effectively combining these resources.

As a result, no new sensor node needs to be provided to satisfy the request, and various needs can be satisfied by combining the existing sensor nodes.

A management program according to an eleventh aspect of the invention is a management program for satisfying a request input from outside by causing resources included in a plurality of sensor nodes to be provided for the request, and causes a computer to execute a management method including: an accepting step, a resource information acquisition step, a required resource information calculation step, an insufficient resource information calculation step, a combination determination step, and a communication step. In the accepting step, the request is accepted. In the resource information acquisition step, information regarding the resources included in the plurality of sensor nodes is acquired. In the required resource information calculation step, information regarding resources required to satisfy the request accepted in the accepting step is calculated. In the insufficient resource information calculation step, the required resources calculated in the required resource information calculation step is compared with resources included in each of the plurality of sensor nodes, and information regarding an insufficient resource that each of the sensor nodes lacks is calculated. In the combination determination step, a combination of resources required to satisfy the request is determined, based on the information regarding the insufficient resource calculated in the insufficient resource information calculation step. In the communication step, a command to cause the plurality of sensor nodes that include the required resources to provide the required resources is transmitted, based on the combination determined in the combination determination step.

Here, even if various unexpected needs (requests) are given, the information regarding the resources included in the plurality of sensor nodes is acquired, and a function that cannot be realized with one sensor node is realized by combining resources included in the plurality of sensor nodes.

Here, the request input from outside may be, for example, a request that is directly input by a user, or may be a request that is input from an external apparatus, an external system, or the like.

A sensor node may be, for example, an apparatus in which various sensors, a data processing function, a data communication function, a memory function, and so on, are mounted on a substrate. Various sensors included in a sensor node may be various sensors for measuring physical quantities, such as an acceleration sensor, a voltage sensor, a current sensor, a temperature sensor, a humidity sensor, an illuminance sensor, a weight sensor, a motion sensor, a contact sensor, and a pressure sensor. The data processing function included in a sensor node may be, for example, FFT (Fast Fourier transform), encryption processing, or the like. Furthermore, the data communication function included in a sensor node may be, for example, wireless communication (ZigBee (registered trademark), Bluetooth (registered trademark) etc.), or wireless communication (wireless LAN etc.) or wired communication (LAN etc.) in which communication is enabled via an IP network or the like. Furthermore, the memory function included in a sensor node may be a RAM (Random Access Memory), a ROM (Read Only Memory), or the like in which sensor data can be stored.

The information (resource information) regarding resources acquired by the resource information acquisition step is resource information provided by the plurality of sensor nodes, and is information regarding resources that can be used for uses that differ from the original uses of the individual sensor nodes, for example. It is favorable that the resource information is always updated to the latest information by being regularly acquired from the respective sensor nodes.

The required resource information calculated in the required resource information calculation step may be calculated using the resource information acquired in the resource information acquisition step as-is, or may be calculated using resource information that is retrieved from a storage unit, external server, cloud system, or the like in which the resource information acquired in the resource information acquisition step is temporarily stored.

The insufficient resource information calculated in the insufficient resource information calculation step refers to information regarding insufficient resources for a request that cannot be executed with a single sensor node.

In the combination determination step, a combination is determined that enables the request that cannot be executed with a single sensor node to be realized, by combining resources included in the plurality of sensor nodes. One or more resource combinations may be determined in the combination determination step. For example, if a plurality of combinations are listed, the best combination that meets various conditions may be selected.

The management apparatus may be provided in a location that differs from the locations of the sensor nodes, or may be provided in a specific sensor node, as long as the management apparatus can communicate with the plurality of sensor nodes.

Thus, for example, even if a request is input that cannot be realized only with resources included in any one of the plurality of sensor nodes, the request can be readily realized by using the resources included in the plurality of sensor nodes while effectively combining these resources.

As a result, no new sensor node needs to be provided to satisfy the request, and various needs can be satisfied by combining the existing sensor nodes.

Advantageous Effects of Invention

The management apparatus according to the present invention enables various needs to be satisfied by combining resources included in a plurality of sensor nodes.

BRIEF DESCRIPTION OF DRAWINGS

FIG. 10 shows the content of a resource management table that is provided in a sensor node included in the management system in FIG. 1.

FIGS. 11(a) and 11(b) show examples of table configurations of a resource DB that is included in the management system in FIG. 1.

FIG. 12 shows an example of a table configuration (resource management table) of a resource DB that is included in the management system in FIG. 1.

FIGS. 14(a), 14(b), and 14(c) show the content of resources included in respective sensor nodes in the management system shown in FIG. 13.

FIG. 15 shows an example of a transmission packet that is transmitted from a sensor node in the management system shown in FIG. 13.

FIG. 16 shows a result of calculating resources required for a need input from outside, in the management system shown in FIG. 13.

FIG. 17 shows feasibility evaluation for a need input from outside, in the management system shown in FIG. 13.

FIG. 19 shows an example of a transmission packet that is transmitted from the coordinator in the management system shown in FIG. 13.

FIGS. 23(a) and 23(b) show the content of resources included in respective sensor nodes in the management system shown in FIG. 22.

FIG. 24 shows a result of calculating resources required for a need input from outside, in the management system shown in FIG. 22.

FIG. 25 shows feasibility evaluation for a need input from outside, in the management system shown in FIG. 22.

DESCRIPTION OF EMBODIMENTS

The following is a description of a coordinator (management apparatus) 10 according to an embodiment of the present invention and a management system 1 that includes the coordinator 10, with reference to FIGS. 1 to 12.

Figure 1:
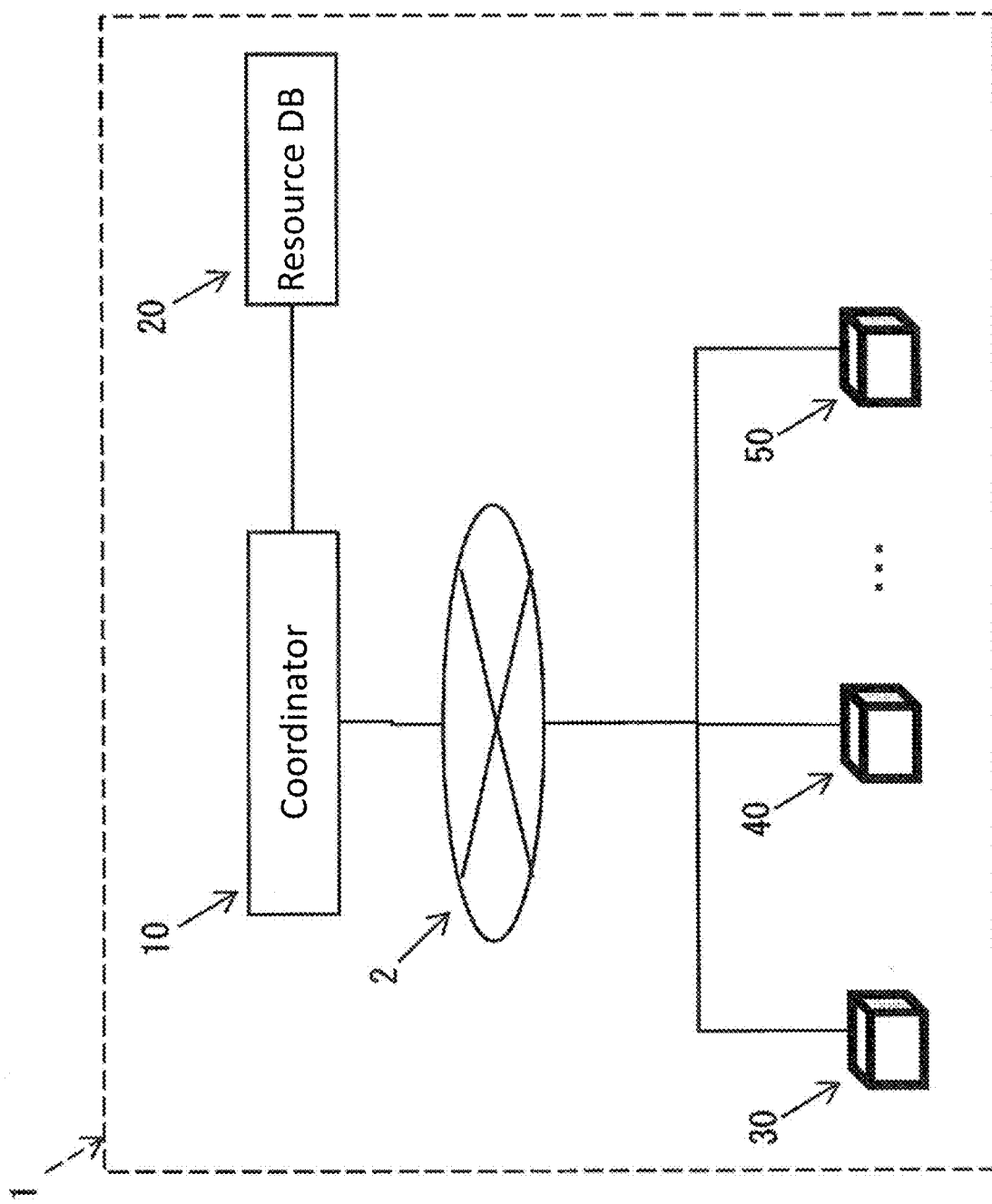
FIG. 1 is a block diagram showing a configuration of a management system that includes a coordinator according to an embodiment of the present invention.

As shown in FIG. 1, the management system 1 accordingly to this embodiment includes a coordinator (management apparatus) 10 and a plurality of sensor nodes 30, 40, and 50 that are connected to each other via the Internet 2, and a resource database (database) (hereinafter, "resource DB") (storage unit) 20 that is connected to the coordinator 10.

Although this embodiment takes, as an example, a configuration in which the management system 1 includes three sensor nodes 30, 40, and 50, the number of sensor nodes included in the management system 1 is not limited to three.

The coordinator 10 is a node that has a network management function, and performs a later-described management method, and performs a later-described management method. Thus, the coordinator 10 can satisfy various needs by executing resources included in the plurality of sensor nodes 30, 40, and 50 while combining these resources.

Figure 2:
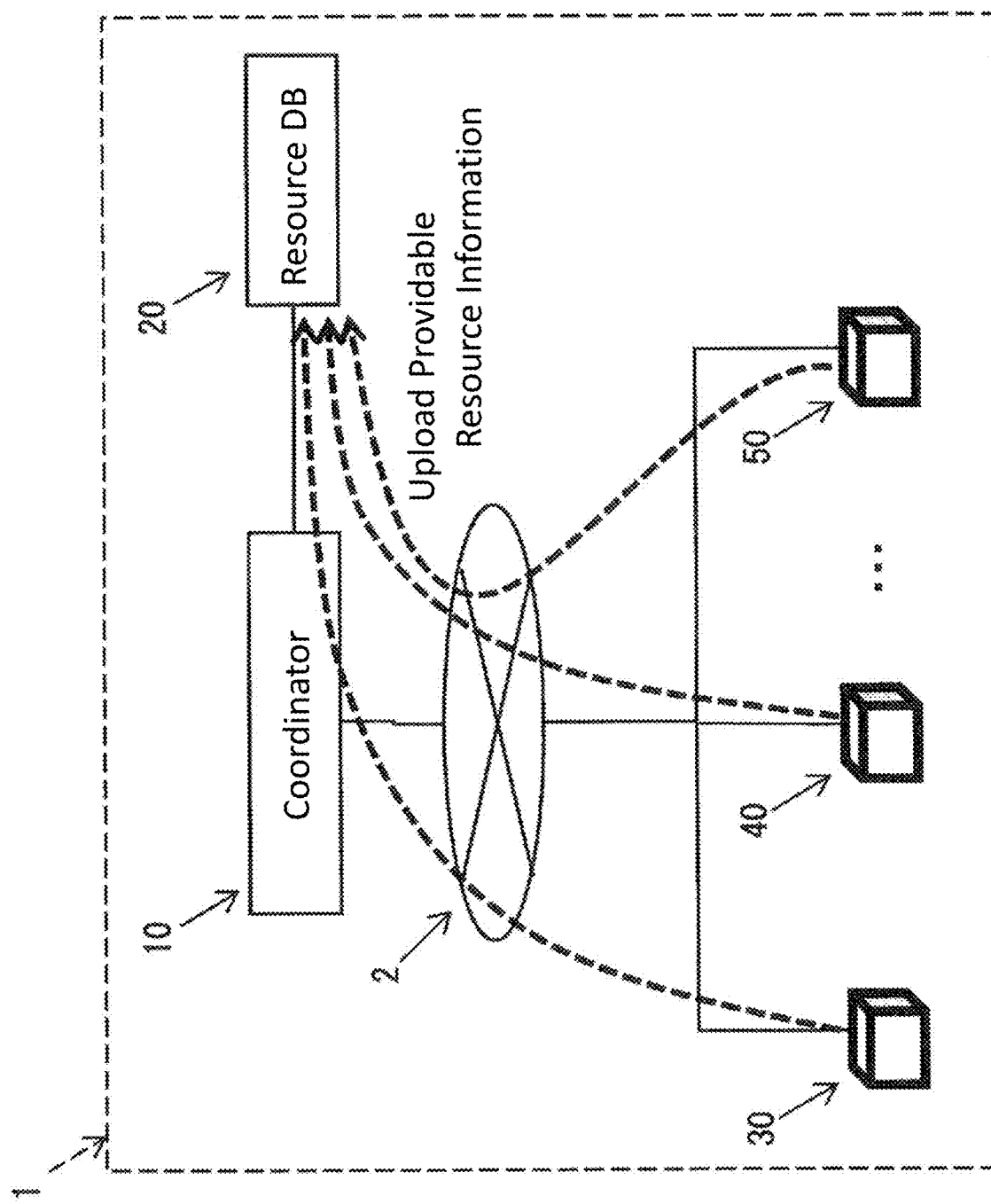
FIG. 2 is a block diagram showing a state where the latest resource information is uploaded from sensor nodes in the management system shown in FIG. 1.

Specifically, the coordinator 10 acquires, via the Internet 2, resource information that is regularly transmitted from the sensor nodes 30, 40, and 50, and stores it in the resource DB 20, as shown in FIG. 2.

Figure 3:
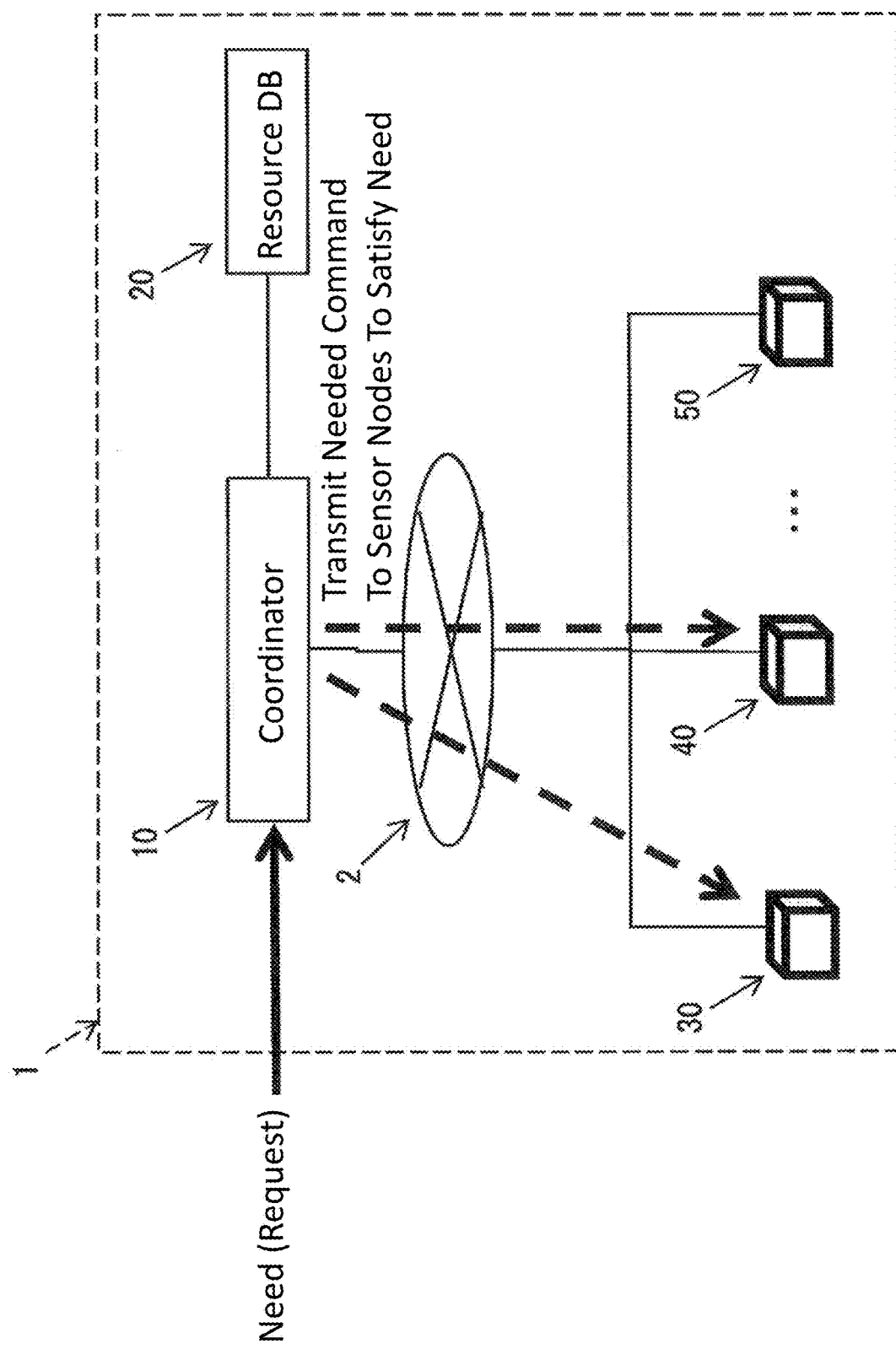
FIG. 3 is a block diagram showing a state of transmitting, to sensor nodes, a command needed for a need input from outside, in the management system shown in FIG. 1.

When a need (request) input from outside cannot be realized with one sensor node, the coordinator 10 transmits a command to the sensor nodes 30 and 40 to execute resources included in the sensor nodes 30 and 40 while combining these resources, as shown in FIG. 3. It is thus possible to satisfy even an unexpected need that differs from the purposes for which the sensor nodes 30, 40, and 50 are installed.

That is to say, the sensor nodes 30, 40, and 50 are installed for respective, specific purposes, and have respective, unique functions. For this reason, if an unexpected need that differs from the purposes intended when the sensor nodes were designed is input from outside, this need may not be able to be satisfied only with any one of the sensor nodes 30, 40, and 50. In this case, conventionally, a new sensor node needs to be installed to satisfy the need.

In this regard, the coordinator 10 according to this embodiment executes resources included in the plurality of sensor nodes 30, 40, and 50 while combining these resources so as to be able to satisfy various needs, using the resource information that are provided by the sensor nodes 30, 40, and 50 and stored in the resource DB 20.

A specific configuration of the coordinator 10 will be described later in detail.

The resource DB 20 stores information (resource information) regarding resources included in the respective sensor nodes 30, 40, and 50, the information having been received from the sensor nodes 30, 40, and 50 via the coordinator 10 and the Internet 2.

More specifically, the resource DB 20 stores information regarding resources that are provided by the sensor nodes 30, 40, and 50 and that can be provided for uses that differ from the original uses of the respective sensor nodes 30, 40, and 50. Here, the resources of the sensor nodes 30, 40, and 50 that can be provided for other uses change over time. For this reason, the latest resource information to be stored in the resource DB 20 is provided by the sensor nodes 30, 40, and 50 every predetermined time, and thus the resource information is updated regularly.

The resource information stored in the resource DB 20 includes, for example, information regarding the types of sensors that the sensor nodes 30, 40, and 50 have, memory capacity, data processing functions, communication functions (network), time (cycle), and so on (see FIG. 12 and other diagrams).

The respective sensor nodes 30, 40, 50 are designed and installed for their unique purposes. The sensor nodes 30, 40, and 50 regularly transmit the latest information regarding resources included in the respective sensor nodes, to the coordinator 10 via the Internet 2.

A specific configuration of the sensor node 30 will be described later in detail.

Coordinator 10

The coordinator 10 according to this embodiment, upon receiving a need (request) input from outside, calculates resources (hardware and software) required to use the respective sensor nodes 30, 40, and 50 included in the management system 1 for a use that differs from their original uses. The coordinator 10 then calculates information regarding insufficient resources (insufficient resource information) (amount, time etc.) that the respective sensor nodes 30, 40, and 50 lack for satisfying the need, based on the calculated required resource information and the information in the resource DB 20, namely accumulated information regarding resources that can be provided by the sensor nodes 30, 40, and 50.

Information regarding resources that can be provided by the sensor nodes 30, 40, and 50 includes the types of sensors that the sensor nodes 30, 40, and 50 have, memory capacity, data processing functions, communication methods and performance, power supply information, and so on.

Furthermore, the coordinator 10 generates a plurality of combination patterns of resources included in the plurality of sensor nodes 30, 40, and 50, the combination patterns enabling the resources to complement each other, based on information regarding the need and the insufficient resource information.

The coordinator 10 then transmits, to the sensor nodes 30, 40, and 50, a command to provide resources included in the sensor nodes 30, 40, and 50 for a use that differs from their original uses.

Thus, as a result of the sensor nodes 30, 40, and 50 providing required resources in accordance to the received command, the need input from outside can be satisfied even if the resources are used for a use that differs from the original uses of the sensor nodes 30, 40, and 50.

Figure 4:
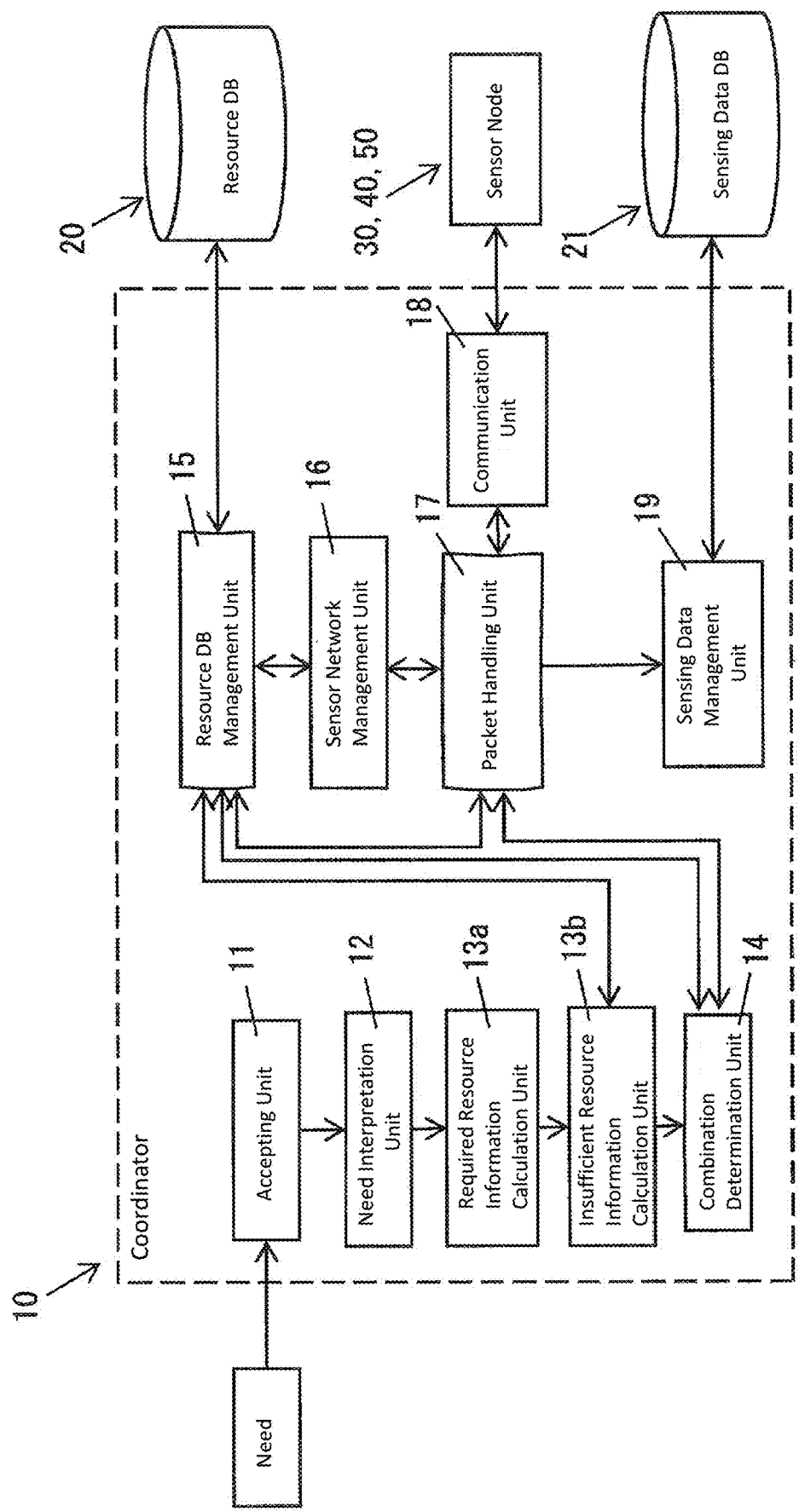
FIG. 4 is a block diagram showing a configuration of a coordinator (management apparatus) that is included in the management system in FIG. 1.

As shown in FIG. 4, to perform the above-described management method, the coordinator 10 according to this embodiment includes an accepting unit 11, a need interpretation unit 12, a required resource information calculation unit 13a, an insufficient resource information calculation unit 13b, a combination determination unit 14, a resource DB management unit 15, a sensor network management unit 16, a packet handling unit 17, a communication unit (resource information acquisition unit; communication unit) 18, and a sensing data management unit 19.

The accepting unit 11 accepts a need, which is input by a user and is described in natural language, and transmits it to the need interpretation unit 12.

The need interpretation unit 12 breaks down the need input by the user by functional requirements, and extracts, from input information, performance information needed to calculate resources required to realize respective functions.

The required resource information calculation unit 13a calculates the types of required resources and required performance, based on a need for each functional requirement (measurement/data storage/data processing) extracted by the need interpretation unit 12.

The insufficient resource information calculation unit 13b calculates information regarding resources that are insufficient for satisfying the need with each of the sensor nodes 30, 40, and 50, using the resource information saved in the resource DB 20.

The combination determination unit 14 generates a plurality of resource combinations to realize the types of required resources and the required performance. That is to say, the combination determination unit 14 generates a plurality of combinations that contain information regarding which resources of which of the sensor nodes 30, 40, and 50 are to be used, as well as regarding the time to use the resources, and the amount of resources to be used.

The combination determination unit 14 then determines the resource combination to be ultimately executed from the plurality of generated resource combinations, based on information regarding currently-used resources and whether or not a change request has been made from the sensor nodes 30, 40, and 50.

Furthermore, the combination determination unit 14 transmits, to the resource DB management unit 15, information that the combination determination unit 14 is to acquire from the resource DB 20, and transmits, to the resource DB management unit 15, information that the combination determination unit 14 is to write in the resource DB 20.

The resource DB management unit 15 transmits an SQL statement to the resource DB 20 based on a request to read and write the resource information stored in the resource DB 20, the request having been made by the combination determination unit 14.

The sensor network management unit 16 manages a procedure for the sensor nodes 30, 40, and 50 to join and leave a sensor network. The sensor network management unit 16 transmits, to the resource DB management unit 15, information in the resource DB 20 that is to be updated, based on the result of the sensor nodes 30, 40, and 50 joining or leaving a sensor network.

The packet handling unit 17 transmits data received from the sensor nodes 30, 40, and 50 via the communication unit 18 to appropriate constituent elements in accordance with the data type. The packet handling unit 17 then receives information to be transmitted to the sensor nodes 30, 40, and 50, from each unit, generates a packet, and transmits the generated packet to the communication unit 18.

The communication unit 18 is a communication means that is connected to the sensor nodes 30, 40, and 50, transmits packets to the sensor nodes 30, 40, and 50, and also receives packets from the sensor nodes 30, 40, and 50 (i.e. physically emits and receives radio waves).

As shown in FIG. 4, the sensing data management unit 19 receives sensing data to be written in the sensing data DB 21 provided outside the coordinator 10 from the packet handling unit 17, and generates and issues a command to write the sensing data in the sensing data DB 21.

With the above-described configuration, the coordinator 10 according to this embodiment can make the existing sensor nodes 30, 40, and 50 lend providable resources thereof to each other, even if a request is made to use the sensor nodes 30, 40, and 50 for a use that differs from their original uses.

As a result, installation of a new sensor node dedicated to satisfying a need input by a user is no longer required, and the need input by the user can be satisfied.

Sensor Node 30

The management system 1 according to this embodiment includes the plurality of sensor nodes 30, 40, and 50, each of which is configured as an apparatus in which various sensors, a data processing function, a data communication function, a memory function, and so on are mounted on a substrate, for example.

Here, a configuration of one of these sensor nodes, namely the sensor node 30 will be described as an example. Although detailed description of the other sensor nodes 40 and 50 are omitted, they also have substantially the same configuration as that of the sensor node 30.

Figure 5:
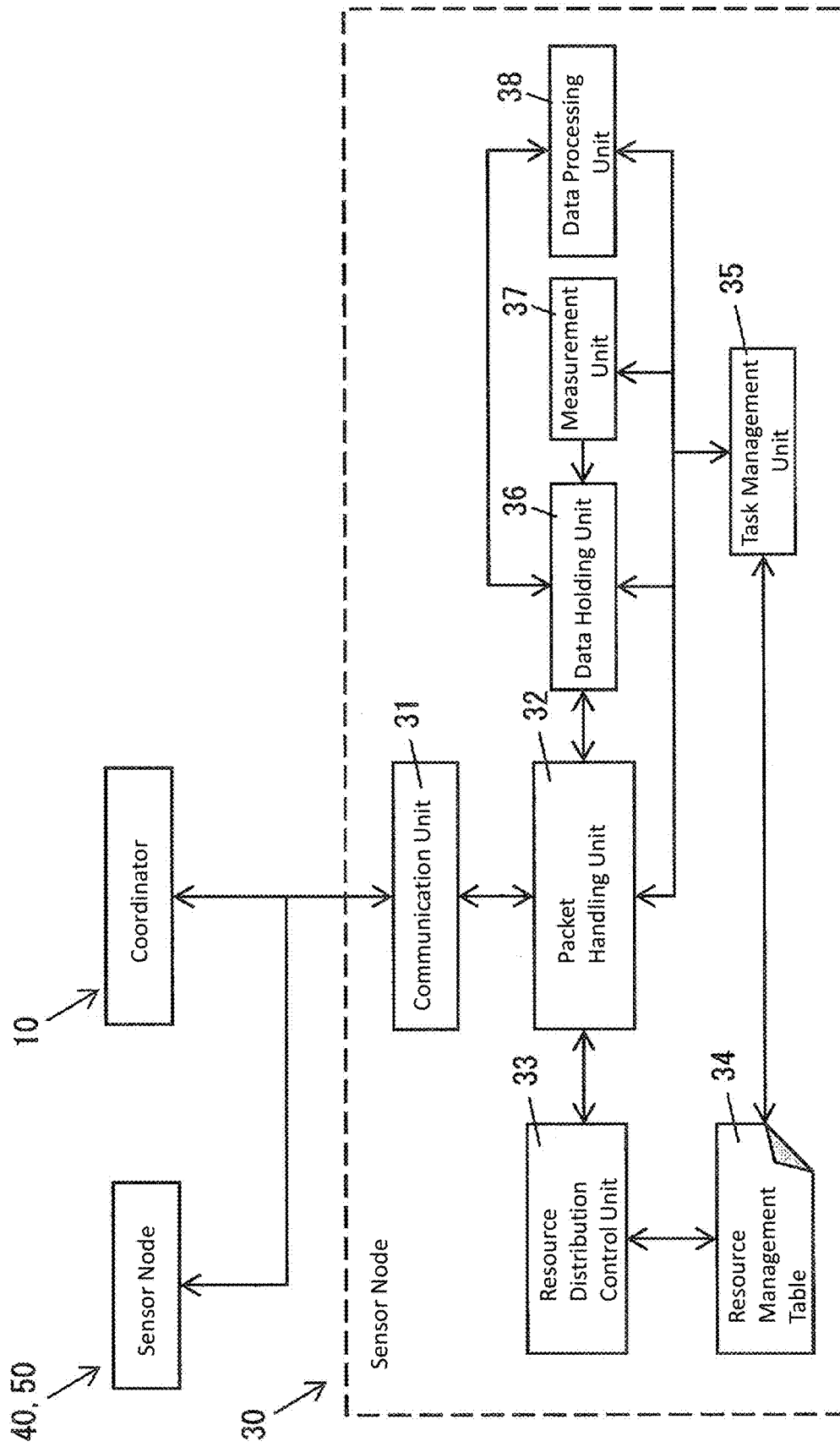
FIG. 5 is a block diagram showing a configuration of a sensor node that is included in the management system in FIG. 1.

As shown in FIG. 5, the sensor node 30 includes a communication unit 31, a packet handling unit 32, a resource distribution control unit 33, a resource management table 34, a task management unit 35, a data holding unit 36, a measurement unit 37, and a data processing unit 38.

As shown in FIG. 5, the communication unit 31 is connected to the other sensor nodes 40 and 50 and the coordinator 10. The communication unit 31 transmits packets to the other sensor nodes 40 and 50, and receives packets from the sensor nodes 40 and 50. Also, the communication unit 31 transmits packets to the other sensor nodes 40 and 50, and receives packets from the coordinator 10.

The packet handling unit 32 transmits data received from the other sensor nodes 40 and 50 or the coordinator 10 via the communication unit 31, to appropriate constituent elements (resource distribution control unit 33, data holding unit 36, measurement unit 37, data processing unit 38 etc.) in accordance with the data type. Also, the packet handling unit 32 receives information to be transmitted to the other sensor nodes 40 and 50 or the coordinator 10 from any of the constituent elements, generates a packet, and transmits the generated packet to the communication unit 31.

The resource distribution control unit 33 calculates information (type, providable time etc.) of resources that can be provided for uses that differ from the original use of the sensor node 30, based on a request from the coordinator 10, and information acquired from the resource management table 34. The resource distribution control unit 33 then reads and writes the content of the resource management table 34.

The resource management table 34 stores information regarding which application will use resources of the sensor node 30 and for how long, for example.

The task management unit 35 references working schedule information regarding each resource that is stored in the resource management table 34, and extracts a task that is to be executed in the closest future. The task management unit 35 then transmits an execution instruction to the constituent elements (packet handling unit 32, data holding unit 36, measurement unit 37, data processing unit 38 etc.).

The data holding unit 36 holds sensing data acquired by the measurement unit 37, data processed by the data processing unit 38, data received from the other sensor nodes 40 and 50, and so on, based on an instruction received from the task management unit 35.

The measurement unit 37 measures a predetermined physical quantity and transmits sensing data to the data holding unit 36, based on an instruction received from the task management unit 35.

The data processing unit 38 acquires input data from the data holding unit 36 to process the data, and transmits the processed data to the data holding unit 36, based on an instruction received from the task management unit 35.

In the management system 1 according to this embodiment, the sensor nodes 30, 40, and 50 provide at least some of their resources for a use that differs from their original uses, based on the content of a packet received from the coordinator 10.

Thus, resources included in the sensor nodes 30, 40, and 50 can be combined and used for a use other than their original uses, in accordance with a need input to the coordinator 10 by the user.

Management Method Performed by the Management System 1

The following is a description of a management method performed by the coordinator 10 according to this embodiment and the management system 1 that includes this coordinator 10, with reference to FIGS. 6 to 9.

Figure 6:
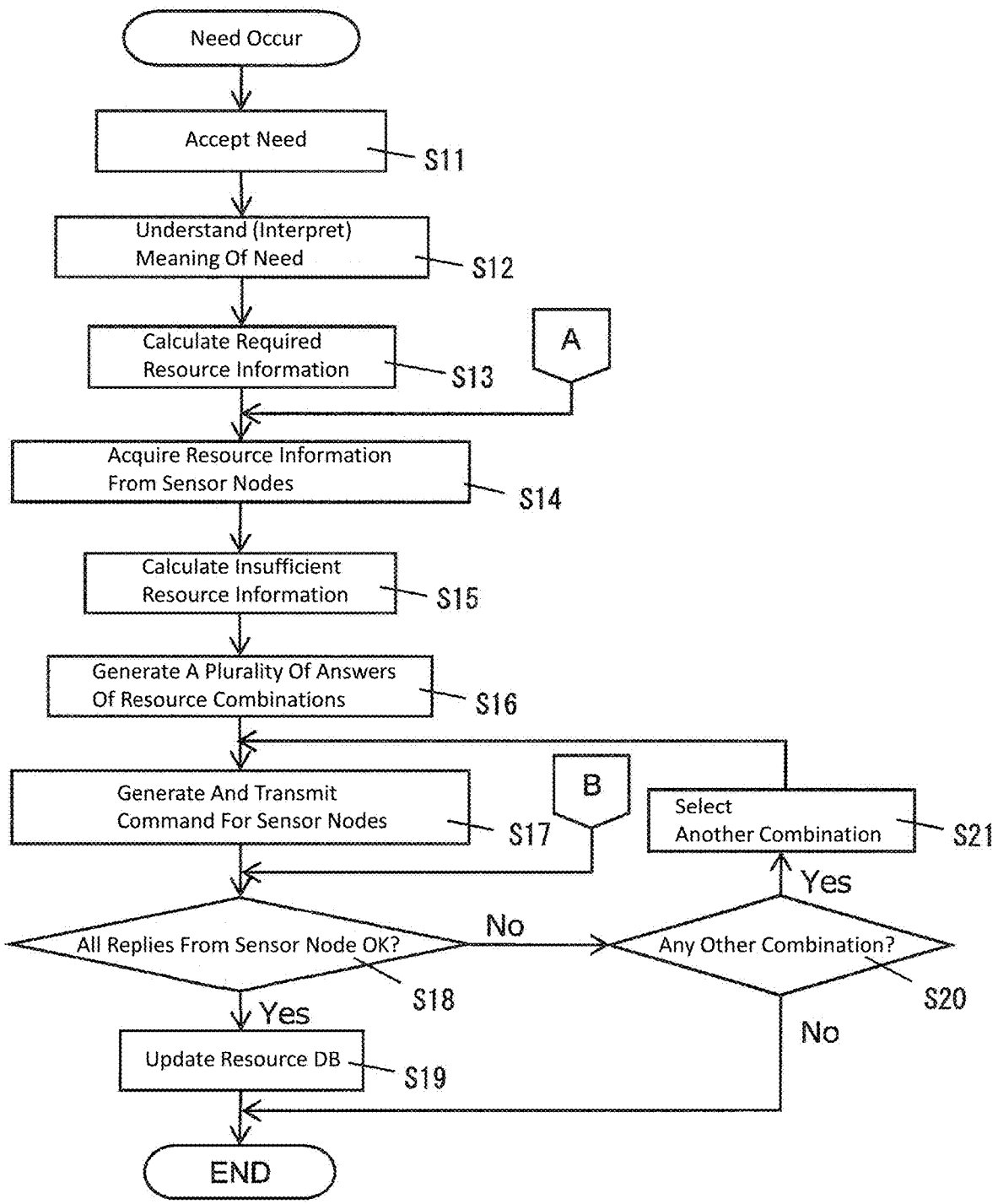
FIG. 6 is a flowchart illustrating a flow of a management method that is performed by the coordinator (management apparatus) included in the management system in FIG. 1.

That is to say, in step S11, the accepting unit 11 in the coordinator 10 first accepts a need input by a user, as shown in FIG. 6.

Next, in step S12, the need interpretation unit 12 interprets the meaning of the need accepted by the accepting unit 11. Specifically, the need interpretation unit 12 breaks down the need input by the user by functional requirements and extracts, from the input information, performance information needed to calculate resources required to realize the respective functions, as mentioned above.

Next, in step S13, the required resource information calculation unit 13a calculates information regarding resources required to satisfy the need input by the user.

"A" that appears between steps S13 and S14 indicates that the resource information stored in the resource DB 20 is updated to the latest information.

Next, in step S14, the communication unit 18 acquires information regarding resources included in the respective sensor nodes 30, 40, and 50, from the plurality of sensor nodes 30, 40, and 50 included in the management system 1.

Next, in step S15, the insufficient resource information calculation unit 13b compares the required resource information calculated in step S13 with the information regarding resources included in the respective sensor nodes 30, 40, and 50 that is acquired in step S14, and calculates information regarding insufficient resources that the respective sensor nodes 30, 40, and 50 lack (insufficient resource information).

Next, in step S16, the combination determination unit 14 generates a plurality of answers (solutions) of resource combinations required to satisfy the need input by the user, based on the resource information stored in the resource DB 20.

Next, in step S17, the sensing data management unit 19 transmits, to the sensor nodes 30, 40, and 50, a command generated to make a request that the resources included in a specific resource combination be provided by the sensor nodes 30, 40, and 50 that have these resources.

"B" that appears between steps S17 and S18 indicates that replies from the sensor nodes 30, 40, and 50 to which the command has been transmitted is being waited for.

Next, in step S18, replies from the sensor nodes 30, 40, and 50 to which the command has been transmitted are received via the communication unit 18, and whether or not the resources can be provided by the respective sensor nodes 30, 40, and 50 is determined. Here, if the resources can be provided (OK), the processing proceeds to step S19. On the other hand, if the resources cannot be provided due to a change that has been made in the sensor nodes 30, 40, and 50, the processing proceeds to step S20.

Next, in step S19, since it has been determined in step S18 that the resources can be provided by the sensor nodes 30, 40, and 50, the resource information stored in the resource DB 20 is updated so as to ban the resources to be provided from being provided for other uses.

Here, the sensor nodes 30, 40, and 50 to which the command has been transmitted provide the requested resources, and performs processing to satisfy the need.

Next, in step S20, since it has been determined in step S18 that the resources cannot be provided, whether there is any other resource combination that enables the need to be satisfied is checked. Here, the processing proceeds to step S21 if there is any other combination, and the processing ends if not.

Next, in step S21, since it has been determined in step S20 that there is another combination, this combination is selected, and processing in steps S17 to S20 is repeated again.

Figure 7:
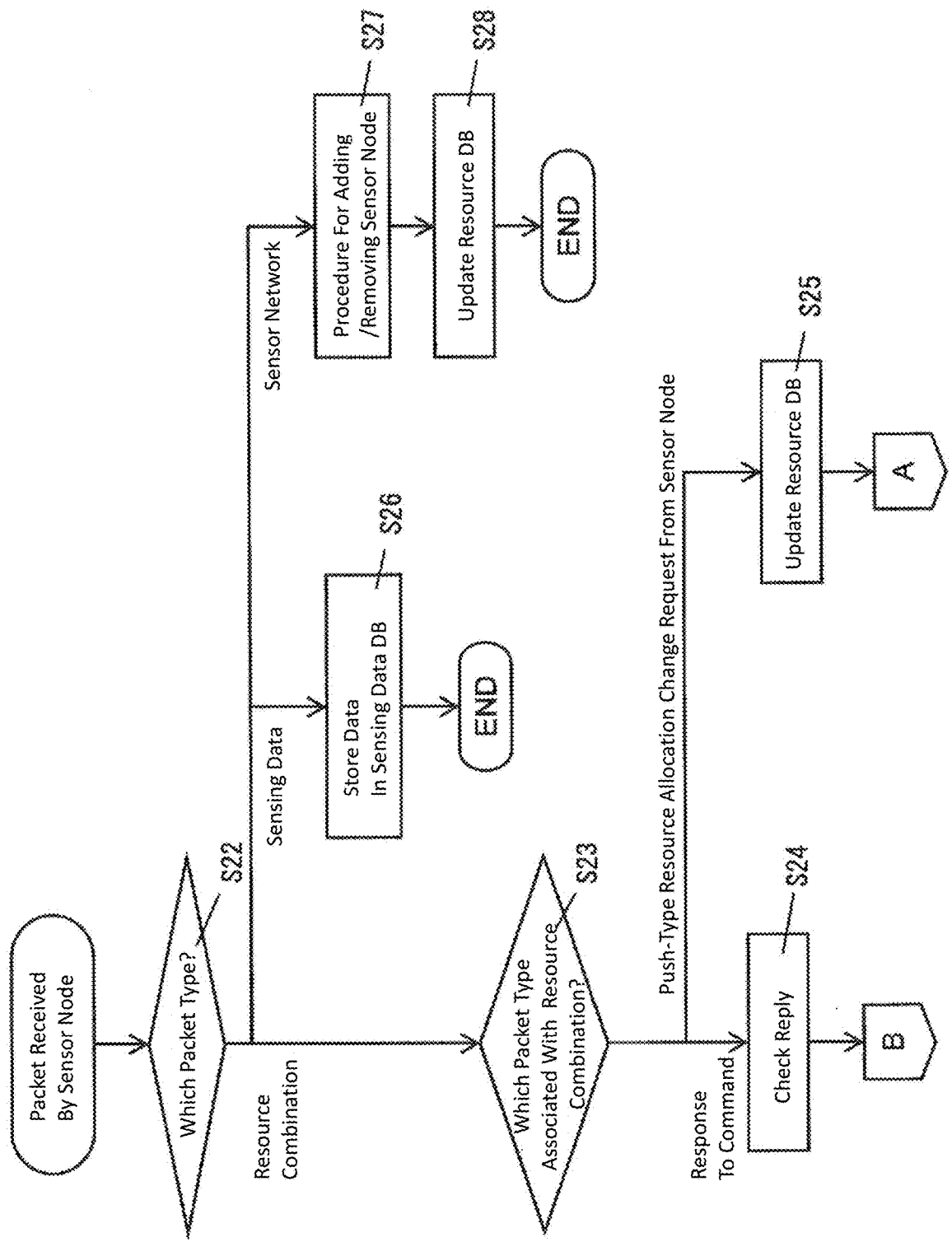
FIG. 7 is a flowchart illustrating a flow of a management method that is performed by the coordinator (management apparatus) included in the management system in FIG. 1.

Furthermore, in the management method according to this embodiment, processing is performed based on the type of a received packet, in accordance with the flowchart shown in FIG. 7.

That is to say, in step S22, the type of packet received from the sensor nodes 30, 40, and 50 is determined. Here, if the type of packet involves content associated with the resource combination, the processing proceeds to step S23. If the type of packet involves content associated with sensing data, the processing proceeds to step S26. If the type of packet involves content associated with a sensor network, the processing proceeds to step S27.

Next, in step S23, the type of packet associated with the resource combination is determined. Here, if the type of packet is a response to the command, the processing proceeds to step S24. On the other hand, if the type of packet is a request to change the resource combination, the processing proceeds to step S25.

In step S24, since the type of received packet is a response to the command, the content of the reply is checked. Then, the processing proceeds to "B" between steps S17 and S18 (FIG. 6).

In step S25, since a change request has been received from the sensor nodes 30, 40, and 50 to which the command to provide resources has been transmitted, the content of the resource DB 20 is updated to the latest information so as to disallow the resources that were able to be provided from being provided. Then, the processing proceeds to "A" between steps S13 and S14 (FIG. 6).

On the other hand, in step S26, since the type of packet involves content associated with sensing data, the sensing data management unit 19 stores data in the sensing data DB 21, and ends the processing.

Furthermore, in step S27, since the type of packet involves content associated with a sensor network, the sensor network management unit 16 adds a new sensor node to the management system 1, or carries out a procedure for removing a sensor node from the management system 1.

Next, in step S28, the resource DB 20 is updated to the latest information so as to add information regarding resources that can be provided by the new sensor node added to the management system 1, or to delete information regarding resources included in the sensor node removed from the management system 1.

Processing in Sensor Nodes 30, 40, and 50

Figure 8:
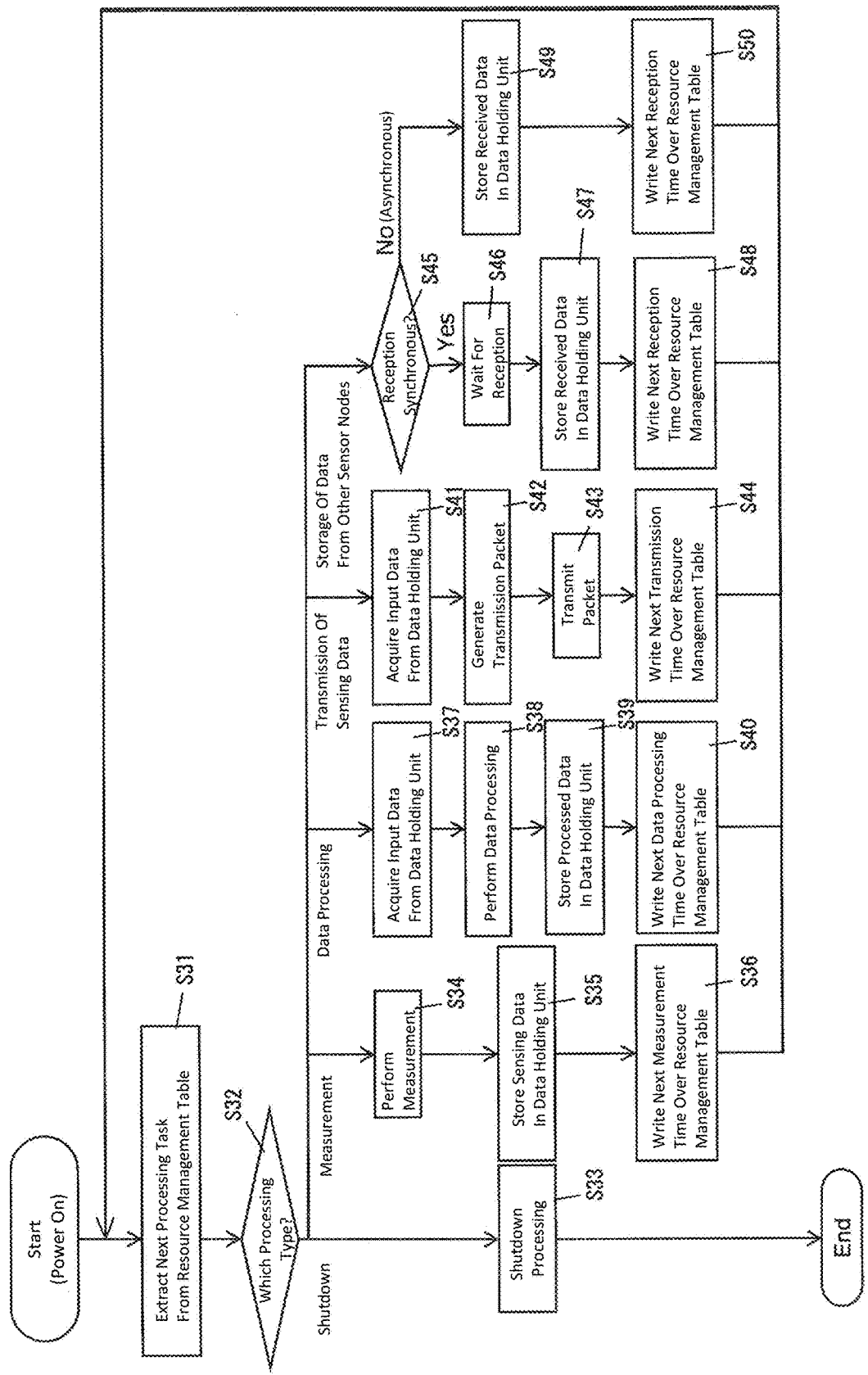
FIG. 8 is a flowchart illustrating a flow of processing performed by a sensor node when the management method is performed by the coordinator (management apparatus) included in the management system in FIG. 1.

In the management method according to this embodiment, each of the sensor nodes 30, 40, and 50 performs processing based on the type of processing task in accordance with the flowchart shown in FIG. 8, in response to the above-described processing performed by the coordinator 10.

That is to say, in step S31, the task management unit 35 in each sensor node (here, the sensor node 30) extracts the next processing task from the resource management table 34.

Next, in step S32, the type of processing task is determined. Here, if the type of processing task involves content associated with a shutdown, the processing proceeds to step S33. If the type of processing task involves content associated with measurement, the processing proceeds to step S34. If the type of processing task involves content associated with data processing, the processing proceeds to step S37. If the type of processing task involves content associated with transmission of sensing data, the processing proceeds to step S41. If the type of processing task involves content associated with storage of data from the other sensor nodes 40 and 50, the processing proceeds to step S45.

In step S33, based on the result of determining the type of processing task, shutdown processing is performed and the processing ends.

In step S34, based on the result of determining the type of processing task, the measurement unit 37 that has received an instruction from the task management unit 35 performs measurement using a sensor.

Next, in step S35, the measurement unit 37 stores the measurement result (sensing data) from the sensor, in the data holding unit 36.

Next, in step S36, assuming that periodic measurement is to be performed, the task management unit 35 overwrites the resource management table 34 to store the next measurement time, via the packet handling unit 32 and the resource distribution control unit 33.

In step S37, based on the result of determining the type of processing task, the data processing unit 38 that has received an instruction from the task management unit 35 acquires input data from the data holding unit 36.

Next, in step S38, the data processing unit 38 performs data processing.

The data processing performed here includes average value calculation, FFT (Fast Fourier Transform) processing, or the like, for example.

Next, in step S39, the data processing unit 38 stores the processed data in the data holding unit 36.

Next, in step S40, assuming that periodic data processing is to be performed, the task management unit 35 overwrites the resource management table 34 to store the next processing time, via the packet handling unit 32 and the resource distribution control unit 33.

In step S41, based on the result of determining the type of processing task, the packet handling unit 32 that has received an instruction from the task management unit 35 acquires input data from the data holding unit 36.

Next, in step S42, the packet handling unit 32 generates a transmission packet.

Next, in step S43, the packet handling unit 32 causes the communication unit 31 to transmit the transmission packet.

Next, in step S44, assuming that periodic packet transmission is to be performed, the task management unit 35 overwrites the resource management table 34 to store the next transmission time, via the packet handling unit 32 and the resource distribution control unit 33.

In step S45, based on the result of determining the type of processing task, the task management unit 35 determines whether or not reception timings are synchronous, when storing the data received from the other sensor nodes 40 and 50. The processing proceeds to step S46 if the reception timings are synchronous, and proceeds to step S49 if not.

Next, in step S46, a reception-waiting state is entered since the timings of reception from the other sensor nodes 40 and 50 are synchronous.

Next, in step S47, the packet handling unit 32, upon receiving data, stores the received data in the data holding unit 36.

Next, in step S48, assuming periodic reception, the task management unit 35 overwrites the resource management table 34 to store the next reception time, via the packet handling unit 32 and the resource distribution control unit 33.

Next, in step S49, since the timings of reception from the other sensor nodes 40 and 50 are asynchronous, the packet handling unit 32 stores the received data in the data holding unit 36.

Next, in step S50, assuming periodic reception, the task management unit 35 overwrites the resource management table 34 to store the next reception time, via the packet handling unit 32 and the resource distribution control unit 33, similarly to step S48.

Figure 9:
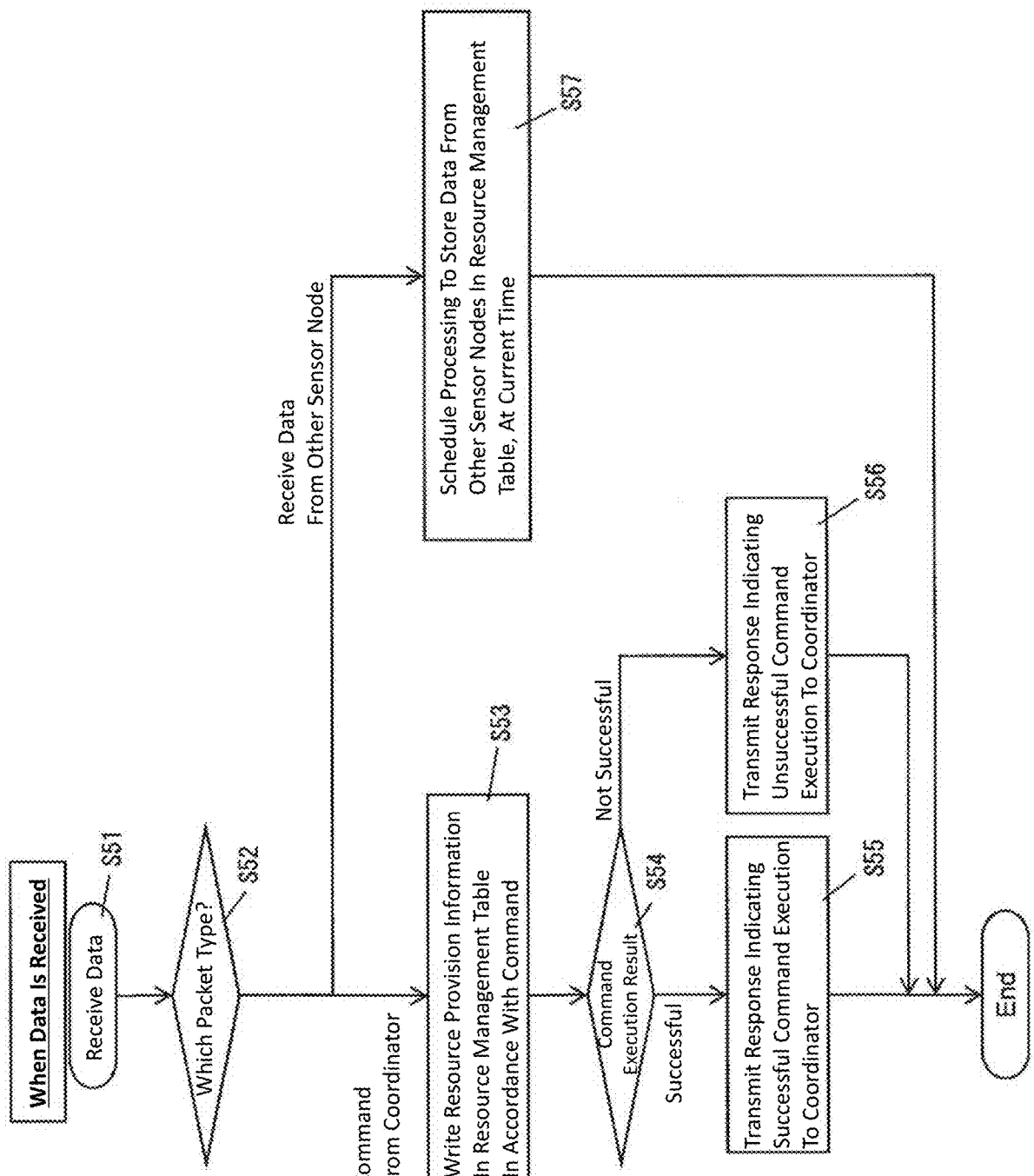
FIG. 9 is a flowchart illustrating a flow of processing performed by a sensor node when the management method is performed by the coordinator (management apparatus) included in the management system in FIG. 1.

In the management method according to this embodiment, if the sensor node 30 receives data, the sensor node 30 performs processing in accordance with the flowchart shown in FIG. 9.

That is to say, if, in step S51, data is received, in step S52, the type of packet of the received data is determined.

Here, if the type of packet is a command transmitted from the coordinator 10, the processing proceeds to step S53. If the type of packet is data transmitted from the other sensor nodes 40 and 50, the processing proceeds to step S57.

Next, in step S53, resource provision information is written in the resource management table 34, in accordance with the content of the command received from the coordinator 10.

Next, in step S54, the result of executing the command received from the coordinator 10 is determined. Here, the processing proceeds to step S55 if the result of executing the command is successful, and proceeds to step S56 if not.

Next, in step S55, a response indicating that the result of executing the command is successful is transmitted to the coordinator 10 via the communication unit 31.

On the other hand, in step S56, a response indicating that the result of executing the command is not successful to the coordinator 10 via the communication unit 31.

In step S57, processing to store data received from the other sensor nodes 40 and 50 in the resource management table 34 is scheduled at the current time.

Resource Management Table 34

The following is a description of an example of the content of the resource management table 34 in the sensor node 30, in relation to the coordinator 10 according to this embodiment and the management system 1 that includes the coordinator 10, with reference to FIG. 10.

That is to say, as shown in FIG. 10, the resource management table 34 stores information regarding task categories, task (Task) numbers, priorities (Priority), statuses (Status), application (App.) numbers, start time (Start Time), and cycles (Cycle).

In this embodiment, each task is managed in units of time slots, and for example, a time slot with 1 slot=100 ms is assumed. All tasks are assumed to be completed in one time slot.

The task categories include information regarding measurement (temperature, acceleration), data processing (average value (Ave), FFT), transmission of sensing data (transmission), and temporary storage of sensing data from the other sensor nodes (temporary storage).

The task numbers refer to numbers assigned in the order of acceptance (from 0×01).

The priorities refer to the priorities (which are high in the order from 0×01) that are referenced when processing overlaps at the same time.

The statuses indicate whether processing is currently valid (0×01) or invalid (0×00).

The application numbers are numbers that are assigned in accordance with the content of needs input by a user. Different numbers indicate that different applications are used.

The start times indicate the start time of each type of processing. The values shown in FIG. 10, which are hexadecimal numbers, do not represent absolute time but indicate that processing is performed in the order from a smaller value.

The cycles indicate whether or not respective types of processing are to be performed repeatedly, and represent values associated with the cycle. The values shown in FIG. 10, which are hexadecimal numbers, represent information indicating that processing is performed every five minutes, for example.

Each value of the start time and the cycle is a count value in a time slot, and the actual time is obtained by multiplying each value by 100 ms.

Furthermore, when each task is completed, the next execution timing is scheduled by writing the timing over the entry of the start time.

That is to say, a value obtained by adding the Cycle value to the Start Time value for the task that has been performed at this time is set as the next Start Time value. Then, all start time values in the table are checked. For example, if no value is the same as the next Start Time value, the next Start Time value is written over the Start Time value. On the other hand, if the same value as the next Start Time value is found, the Priority is compared. If the Priority of the current task is higher, the Start Time of this task is overwritten, and the Start Time of the other task with lower priority is incremented by 1 and overwritten. If the Priority of the current task is lower, a value obtained by incrementing the next Start Time value by 1 is set as a new next Start Time value, and the aforementioned check is performed again.

Table in Resource DB 20

The following is a description of an example of a configuration of the resource DB 20 included in the management system 1 according to this embodiment, with reference to FIGS. 11(a), 11(b), and 12.

That is to say, the tables stored in the resource DB 20 include a sensor node number table shown in FIG. 11(a), an attribute ID table shown in FIG. 11(b), and a sensor node resource management table shown in FIG. 12.

The sensor node number table shown in FIG. 11(a) includes information regarding serial numbers, sensor node numbers, positions, and network IDs.

The serial numbers refer to the numbers assigned in the order of acceptance (1 . . . ).

The sensor node numbers refer to the numbers assigned to the respective sensor nodes 30, 40, and 50 that are included in the management system 1.

The positions (Position) indicate information regarding the positions where the respective sensor nodes 30, 40, and 50 is installed, the positions being specified using the GPS (Global Positioning System) information.

The network IDs indicate information for specifying communication methods provided in the respective sensor nodes 30, 40, and 50.

The attribute ID table shown in FIG. 11(*b*) is created to improve search efficiency, and includes information regarding serial numbers, attribute IDs, and descriptions (Description).

The serial numbers refer to the numbers assigned in the order of acceptance (1 . . . ).

The attribute IDs indicate abbreviations of functions stated in the descriptions (Description). For example, SEN, MEM, DPRO, DPRO, and NWK represent measurement (Sensing), recording (storage) (Memory), data processing (Data Processing), and communication (Network), respectively.

The sensor node resource management table shown in FIG. 12 is an aggregation of the resource management tables (resource management table 34 etc.) that the sensor nodes 30, 40, and 50 have. Since the content of the resource management table 34 has already been described with reference to FIG. 10, a description is not given of the sensor node resource management table, which is configured by gathering a plurality of resource management tables 34.

Example 1

The following is a description of a coordinator (management apparatus) 10 according to this example and a management system 1 that includes this coordinator 10, with reference to FIGS. 13 to 21.

Figure 13:
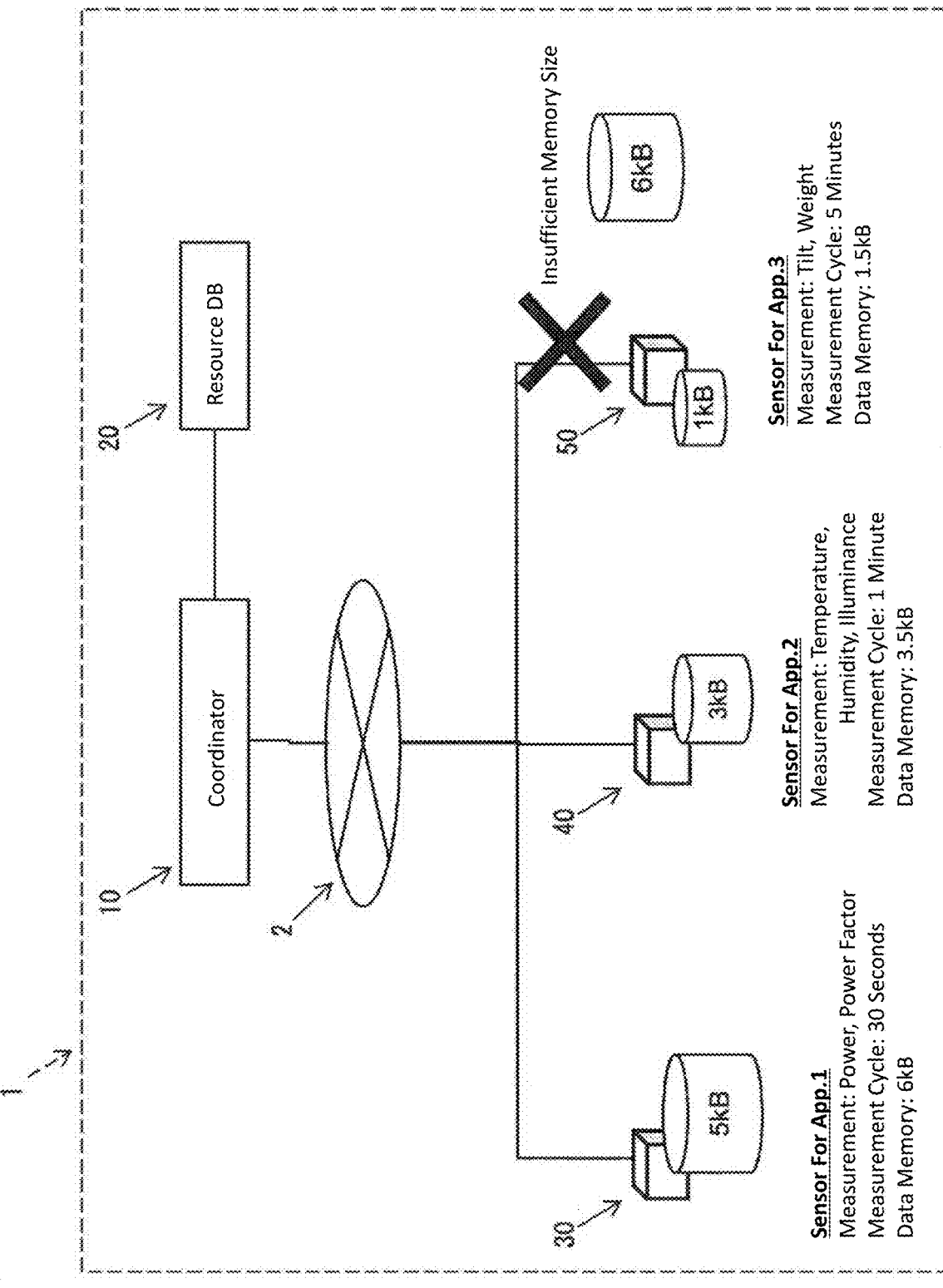
FIG. 13 is a block diagram showing a state where resources are insufficient for a need input from outside, in a management system that includes a coordinator according to Example 1 of the present invention.

It is assumed that, in the management system 1 in this example, three sensor nodes 30, 40, and 50 that have three different sensors for three applications are installed, as shown in FIG. 13.

In this example, when measurement results from the sensors are transmitted from the sensor nodes 30, 40, and 50 to the coordinator 10, information regarding resources that can be provided for uses that differ from the original uses is transmitted together. The coordinator 10 writes the received resource information in the resource DB 20.

Here, it is assumed that an acceleration sensor for tilt measurement is mounted in the sensor node 50 for App.3, and a need for using data of this acceleration sensor for a use that differs from the original uses of the three applications is input by a user. It is also assumed that the user inputs a need for measuring three-axis acceleration data at 400 Hz for 0.5 seconds, and performing this measurement in a cycle of five minutes. In this case, data that is generated during one measurement unit is 6 kB, according to the following equation.

$$3 \text{ axes} \times 400 \text{ sets of data/sec} \times 0.5 \text{ sec} \times 10 \text{ bytes/data} = 6000 \text{ byte} = 6 \text{ kB}$$

In the configuration in this example, the data memory of the sensor node 50 for App.3 only has a capacity of 1.5 kB, the memory accordingly is insufficient for realizing the need input by the user, and thus the need cannot be realized only with the sensor node 50.

FIGS. 14(*a*), 14(*b*), and 14(*c*) illustrate a specific example of resources that are included in the respective sensor nodes 30, 40, and 50 and can be provided for other uses.

As shown in FIG. 14(*a*), resources that are included in the sensor node 30 and can be provided for other uses are sensors for measuring power and power factors, a memory of 5 kB, data processing for encryption (AES128), and data communication at 10 kbps.

As shown in FIG. 14(*b*), resources that are included in the sensor node 40 and can be provided for other uses are sensors for measuring temperature, humidity, and illuminance, a memory of 3 kB, and data communication at 10 kbps. The sensor node 40 has no resources that correspond to the data processing function and can be provided for other uses.

As shown in FIG. 14(*c*), resources that are included in the sensor node 50 and can be provided for other uses are sensors for measuring tilt, three-axis acceleration, and mass, a memory of 1 kB, and data communication at 10 kbps. The sensor node 50 also has no resources that correspond to the data processing function and can be provided for other uses.

Next, a description will be given, with reference to FIG. 15, of an example of a transmission packet that is transmitted from the sensor nodes 30, 40, and 50 to the coordinator 10.

As shown in FIG. 15, a transmission packet that is transmitted from the sensor nodes 30, 40, and 50 to the coordinator 10 is a message frame (Message Frame) that serves as one unit (one packet), and the message frame includes data entity (Data Entity).

Four types of IDs are set as data type IDs (Data Type ID) that are to be included in message frames.

A first ID (0×01) indicates "transmission from sensor node to coordinate; no resource table information".

A second ID (0×02) indicates "transmission from sensor node to coordinator; resource table information available".

A third ID (0×10) indicates "transmission from coordinator to sensor node (command from coordinator)".

A fourth ID (0×00) indicates "broadcast".

The transmission packet shown in FIG. 15 is a packet that is transmitted when resources are provided by any of the sensor nodes 30, 40, and 50, and the second ID (0×02) is set for this packet.

Application IDs included in data entities contain the following information.

IDs (0×01 to 0×FE) indicate "reserved", i.e. indicate that resources are reserved for applications, and an ID (0×FF) indicates providable resource information.

When the application ID is (0×FF), the attribute ID in the resource DB 20 is stored as a sensor data ID that is included in the data entity.

Data of the attribute ID is stored as Sensor Data that is included in the data entity. It is assumed, as an example, that data is text, and its size is up to 20 bytes.

In the management system 1 in this example, if a need is input to the coordinator 10 shown in FIG. 13 by a user, the aforementioned required resource information calculation unit 13*a* (see FIG. 4) calculates required resource information, which is shown in FIG. 16.

In this example, required resource information, i.e. information regarding required resources including the acceleration sensor, a memory of 6 kB, and a 0.16-kbps network (data processing is not required) of the sensor node 50 is calculated to realize the need input by the user, as shown in FIG. 16.

Also, in the coordinator 10, the insufficient resource information calculation unit 13b (see FIG. 4) calculates insufficient resource information, which is shown in FIG. 17, as feasibility evaluation.

In this example, insufficient resource information is calculated as feasibility evaluation indicating that, of the sensor node 50, the acceleration sensor is OK, the memory is insufficient by 5 kB, the 0.16-kbps network is OK, and data processing is not required, with respect to the resources required to realize the need input by the user, as shown in FIG. 17.

At this time, the coordinator 10 searches resource information stored in the resource DB 20.

Specifically, under "search condition: sensor nodes 30 and 40 that are located near sensor node 50 with ID=3, and that can provide Memory", "search result: Sensor Node ID=1, Attribute ID=2, Data=5 kB" and "search result: Sensor Node ID=2, Attribute ID=2, Data=3 kB" are obtained.

Next, in the coordinator 10, the combination determination unit 14 generates a plurality of combination patterns of resources that satisfy the aforementioned search condition.

For example, the combination determination unit 14 obtains "Sensor Node ID=1, Attribute ID=2, Data=5 kB" as a pattern 1, and "Sensor Node ID=1, Attribute ID=2, Data=3 kB" and "Sensor Node ID=2, Attribute ID=2, Data=2 kB" as a pattern 2.

Here, a combination is selected from the plurality of generated combination patterns while giving priority to a combination with lower availability of resources (memory), a combination in which the number of sensor nodes to be combined is smaller, and a combination in which the communication speed between nodes is higher, for example.

Then, based on the resource information received from the plurality of sensor nodes 30, 40, and 50 included in the management system 1, the coordinator 10 understands that another sensor node, namely the sensor node 30 can provide a data memory of 5 kB.

Figure 18:
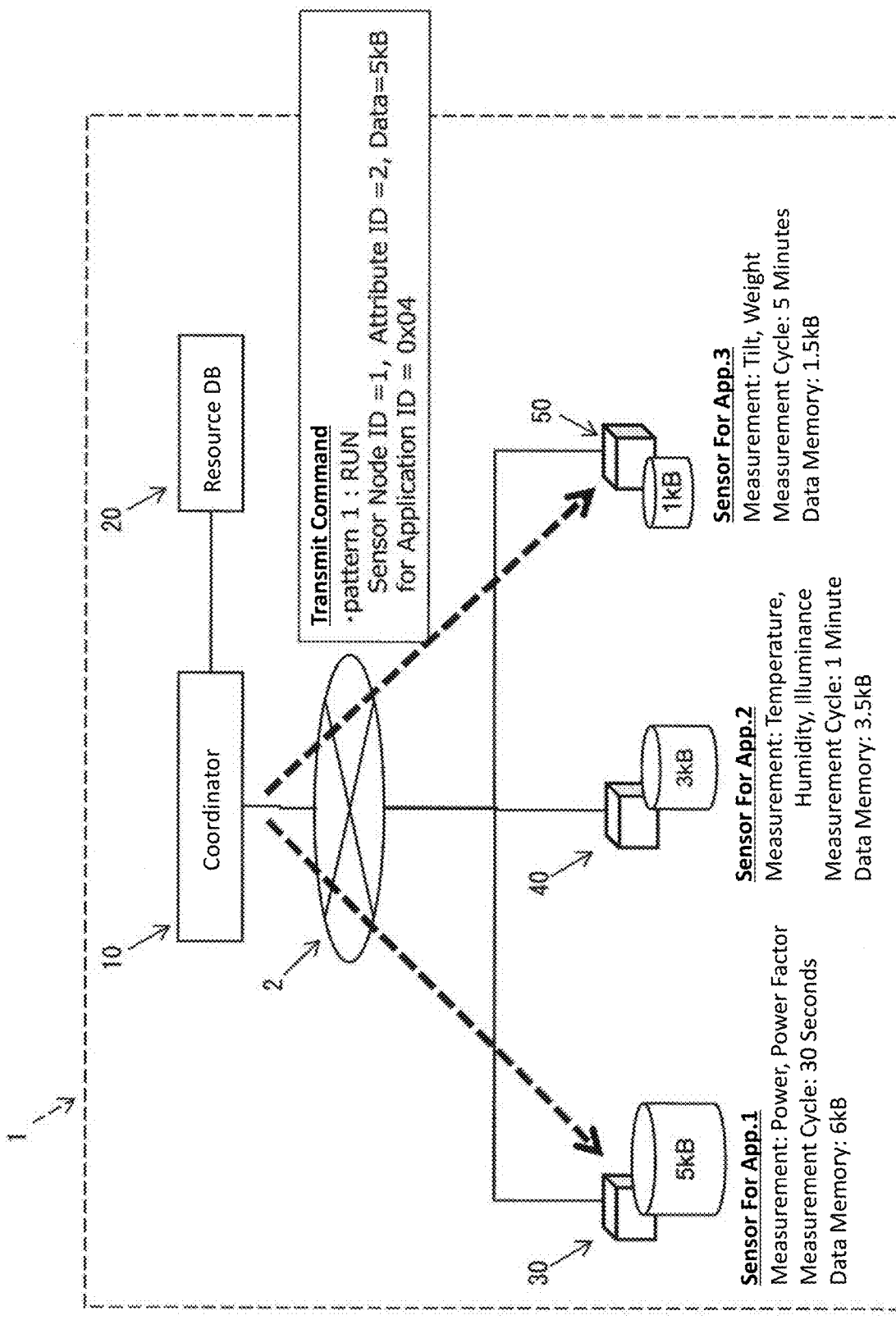
FIG. 18 is a block diagram showing a state where a command is transmitted to sensor nodes that are combined to realize a need input from outside, in the management system shown in FIG. 13.

Then, to combine the resources included in the plurality of sensor nodes 30 and 50 to realize the need input by the user, the coordinator 10 generates a command and transmits the generated command to the sensor nodes 30 and 50, as shown in FIG. 18.

As a result of selecting the combination of the pattern 1, the following command is transmitted to the sensor nodes 30 and 50 to request that the sensor node 30 provide a memory of 5 kB:

pattern 1: RUN
Sensor Node ID=1, Attribute ID=2, Data=5 kB
for Application ID=0×04.

Figure 20:
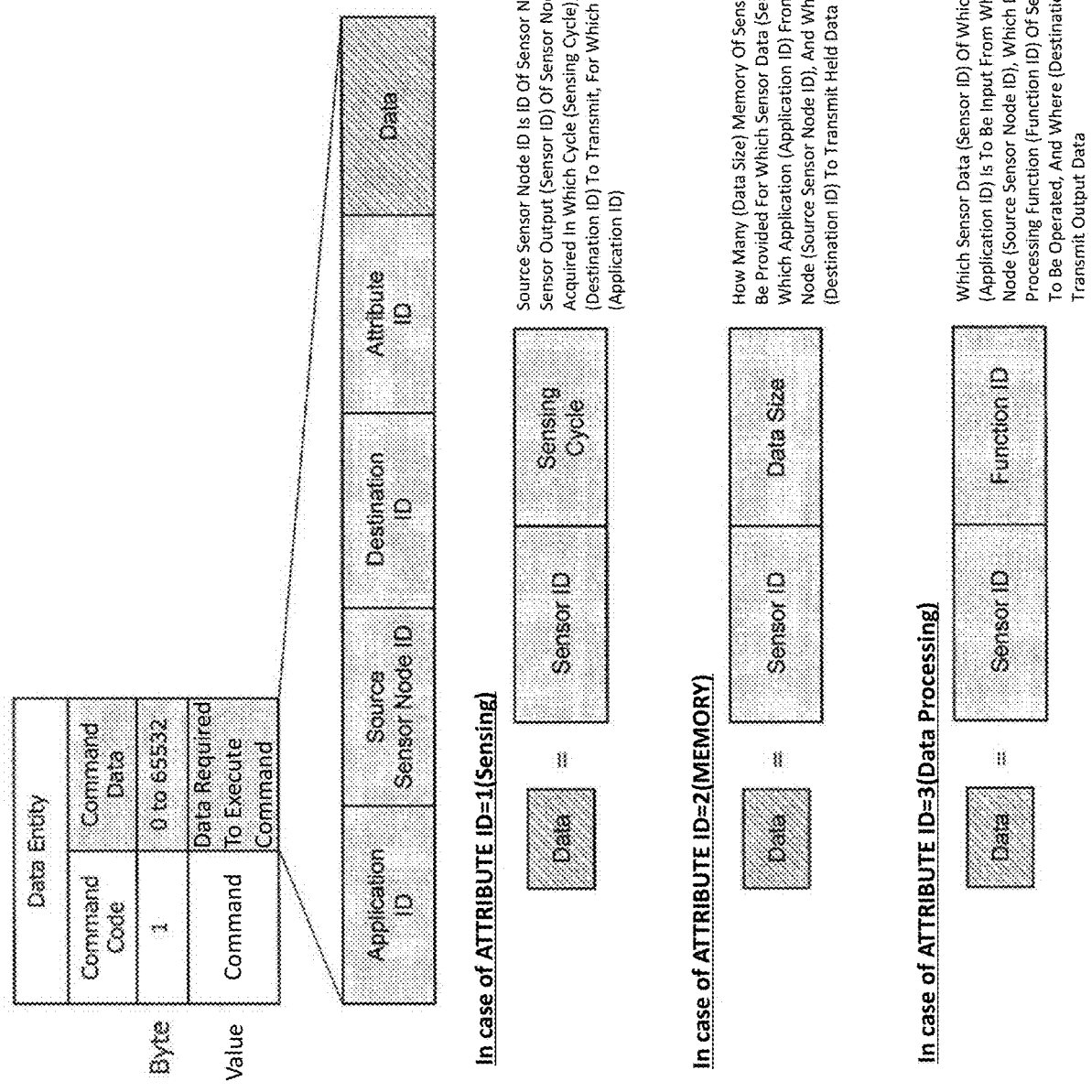
FIG. 20 shows examples of commands that are transmitted from the coordinator in the management system shown in FIG. 13.

The following is a more detailed description of the content of the command transmitted to the sensor nodes 30 and 50, with reference to FIGS. 19 and 20.

As shown in FIG. 19, the command transmitted to the sensor nodes 30 and 50 contains a message frame (Message Frame) that serves as one unit (one packet), and the message frame includes data entity (Data Entity).

Four types of IDs are set as the data type IDs (Data Type IDs) that are to be included in message frames, as mentioned above.

Here, the third ID (0×10) is selected, which indicates "transmission from coordinator to sensor node (command from coordinator)".

Next, data of the command transmitted from the coordinator 10 includes an application ID, a source sensor node ID, a destination ID, an attribute ID, and a data portion, as shown in FIG. 20.

The attribute ID=1 indicates Sensing (measurement), and the data includes a sensor ID and a sensing cycle (Sensing Cycle). Here, the Source Sensor Node ID is the ID of the sensor node itself, and indicates which sensor output (Sensor ID) of the sensor node itself is to be acquired in which cycle (Sensing Cycle) for which application (Application ID), and where (Destination ID) the acquired sensor output is to be sent.

The attribute ID=2 indicates Memory (recording), and the data includes a sensor ID and data size. Here, it is indicated which of the sensor nodes (Source Sensor Node ID) is to provide how much (Data Size) memory of the sensor node itself for which sensor data (Sensor ID) for which application (Application ID), and where (Destination ID) held data is to be sent.

The attribute ID=3 indicates data processing, and the data includes a sensor ID and a function (Function) ID. Here, it is indicated which sensor data (Sensor ID) for which application (Application ID) is to be input from which sensor node (Source Sensor Node ID), data processing function (Function ID) of the sensor node itself is to be operated, and where (Destination ID) to send output data.

Accordingly, in this example, attribute ID=2 is set for the command transmitted to the sensor node 30.

As a result, a command is transmitted from the sensor node 30 to the sensor node 50 so that a memory of 5 kB of the sensor node 30 itself is provided for the acceleration sensor included in the sensor node 50, and so that held data is sent to the sensing data DB 21.

Figure 21:
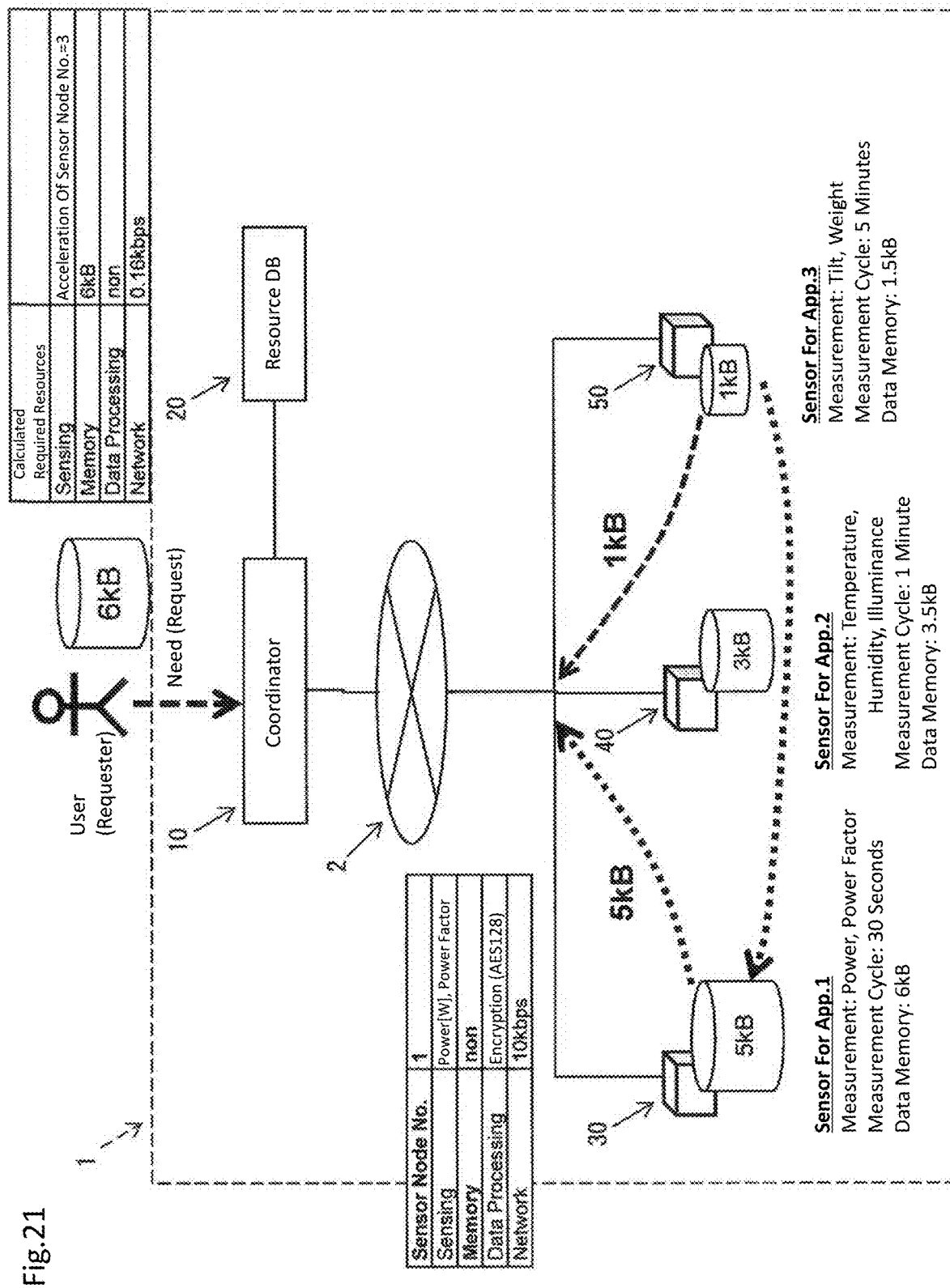
FIG. 21 is a block diagram showing a state where resources included in combined sensor nodes are lent to each other to satisfy a need input from outside, in the management system shown in FIG. 13.

In this example, the above-described management method realizes the need input by the user by combining the resources included in the plurality of sensor nodes 30 and 50 included in the management system 1, as shown in FIG. 21.

That is to say, the coordinator 10 calculates resources required for the need input by the user, as shown in FIG. 21.

The required resource information indicates an acceleration sensor, a memory of 6 kB, and a network of 0.16 kbps.

The coordinator 10 then references information regarding the resources included in the sensor nodes 30, 40, and 50 that is stored in the resource DB 20, and calculates insufficient resource information, i.e. information regarding resources that will be insufficient with one sensor node 50 to realize the need.

In this example, the insufficient resource information indicates a memory of 5 kB.

Since the need cannot be realized only with the sensor node 50, the coordinator references resource information, i.e. information regarding resources that can be provided by the other sensor nodes 30 and 40, and combines the resources included in the other sensor nodes 30 and 40 with the resources included in the sensor node 50.

As a result, as shown in FIG. 21, an acceleration sensor, a memory of 1 kB, and a measurement cycle of 5 minutes, which are resources included in the sensor node 50, are provided, and a memory of 5 kB, which is a resource included in the sensor node 30, is provided.

Then, the sensor node 30 transmits a packet to the coordinator 10 so as to update the information regarding the resources that the sensor node 30 can provide.

Also, the sensor node 30 receives 5 kB of data of AppID=0×04, and thereafter transmits the data to the data holding unit 36.

Thus, although the need input by the user cannot be realized only with the sensor node 50, the need can be readily realized by causing the plurality of other sensor nodes 30 and 40 included in the management system 1 provide resources that are not in use.

As a result, a variety of needs can be satisfied by using resources included in the plurality of sensor nodes 30 and 50 while combining these resources, without setting a new sensor node.

Example 2

The following is a description of a coordinator (management apparatus) 110 in this example and a management system 101 that includes the coordinator 110, with reference to FIGS. 22 to 27.

Figure 22:
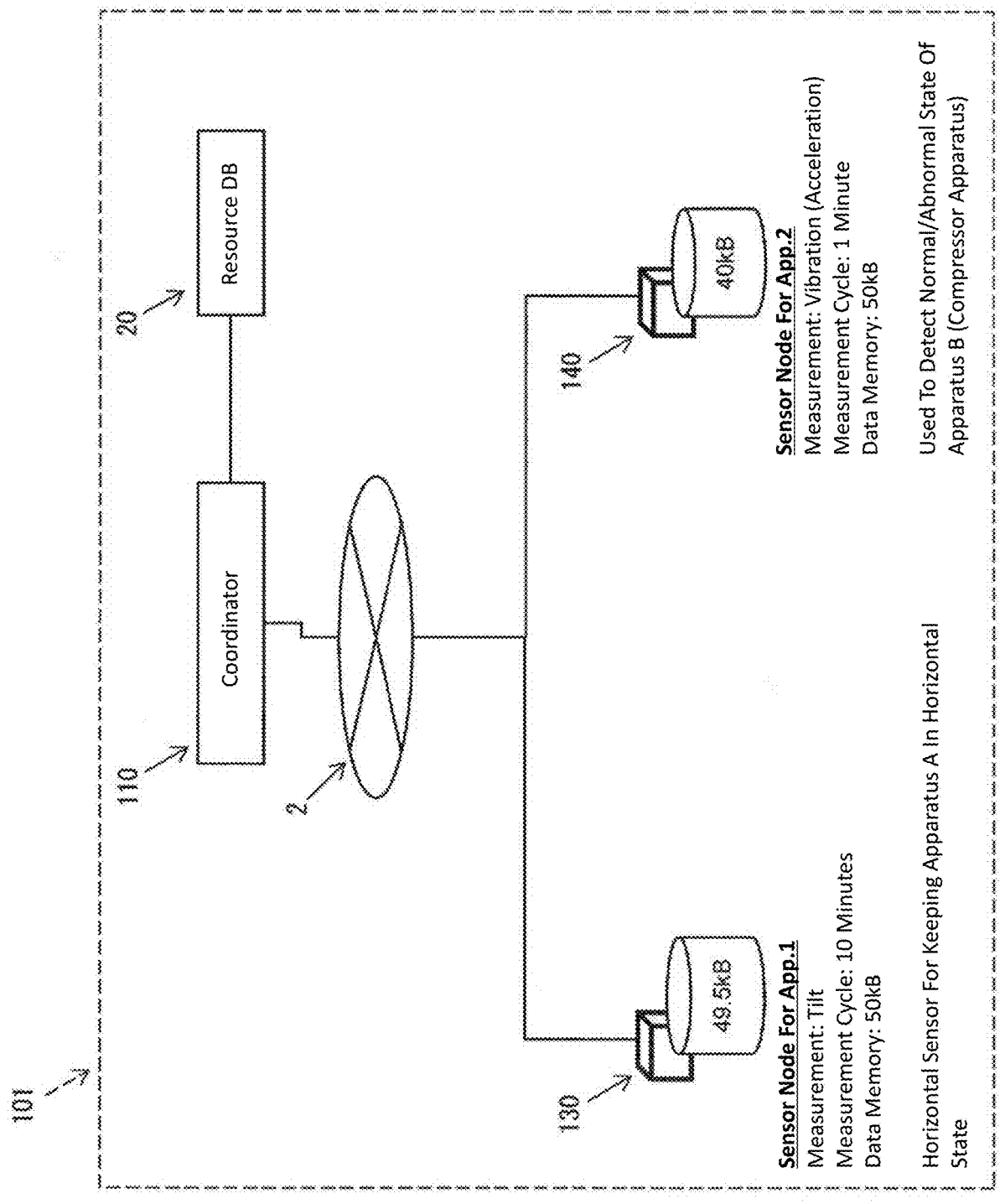
FIG. 22 is a block diagram showing a state where resources are insufficient for a need input from outside, in a management system that includes a coordinator according to Example 2 of the present invention.

It is assumed that, as shown in FIG. 22, three sensor nodes 130 and 140 that have two different sensors for two applications are installed in the management system 101 in this embodiment.

In this example, when measurement results from the sensors are transmitted from the sensor nodes 130 and 140 to the coordinator 10, information regarding resources that can be provided for uses that differ from their original uses is transmitted together. The coordinator 110 writes the received resource information in the resource DB 20.

Here, it is assumed that a user has input a need for understanding frequency spectrum intensity of vibration data with respect to an apparatus A, in which the sensor node 130 is provided. It is also assumed that the user has input a need for measuring three-axis acceleration data at 1 kHz for 1.0 second, and performing this measurement in a cycle of five minutes.

In the configuration in this example, the sensor node 130 provided in the apparatus A does not have an FFT function, and thus, the need input by the user cannot be realized only with the sensor node 130.

Here, a specific example of resources included in the sensor nodes 130 and 140 is shown in FIGS. 23(*a*) and 23(*b*).

As shown in FIG. 23(*a*), resources that are included in the sensor node 130 and can be provided for other uses are a three-axis sensor, which is provided to keep the apparatus A in a horizontal state, a memory of 49.5 kB, and data communication at 10 kbps. The sensor node 130 has no resources that correspond to the data processing function and can be provided for other uses.

As shown in FIG. 23(*b*), resources that are included in the sensor node 140 and can be provided for other uses are a three-axis acceleration sensor for sensing the normal/abnormal state of an apparatus B (compressor) by detecting a vibration thereof, a memory of 40 kB, an FFT data processing function, and data communication at 10 kbps.

In the management system 101 in this example, if a need is input to the coordinator 110 shown in FIG. 22 by a user, the aforementioned required resource information calculation unit 13*a* (see FIG. 4) calculates the required resource information, which is shown in FIG. 24.

In this example, required resource information, i.e. information regarding required resources including the acceleration sensor, a memory of 30 kB, the FFT data function, and a 0.8-kbps network of the sensor node 130 is calculated as resources required to realize the need input by the user, as shown in FIG. 24.

Also, in the coordinator 110, the insufficient resource information calculation unit 13*b* (see FIG. 4) calculates insufficient resource information, which is shown in FIG. 25, as feasibility evaluation.

In this example, insufficient resource information is calculated as feasibility evaluation indicating that, of the sensor node 130, the acceleration sensor is OK, the memory is also OK, the data processing function, namely FFT is lacking, and the 0.8-kbps network is OK, with respect to the resources required to realize the need input by the user, as shown in FIG. 25.

At this time, the coordinator 110 searches resource information stored in the resource DB 20.

Specifically, under "search condition: sensor node 140 near sensor node 130 with ID=2, and sensor node capable of providing FFT as data processing function", "search result: Sensor Node ID=2, Attribute ID=3, Data=FFT" is obtained.

Then, based on the resource information received from the plurality of sensor nodes 130 and 140 included in the management system 101, the coordinator 110 understands that the other sensor node 140 can provide FFT as the data processing function that the sensor node 130 lacks.

Figure 26:
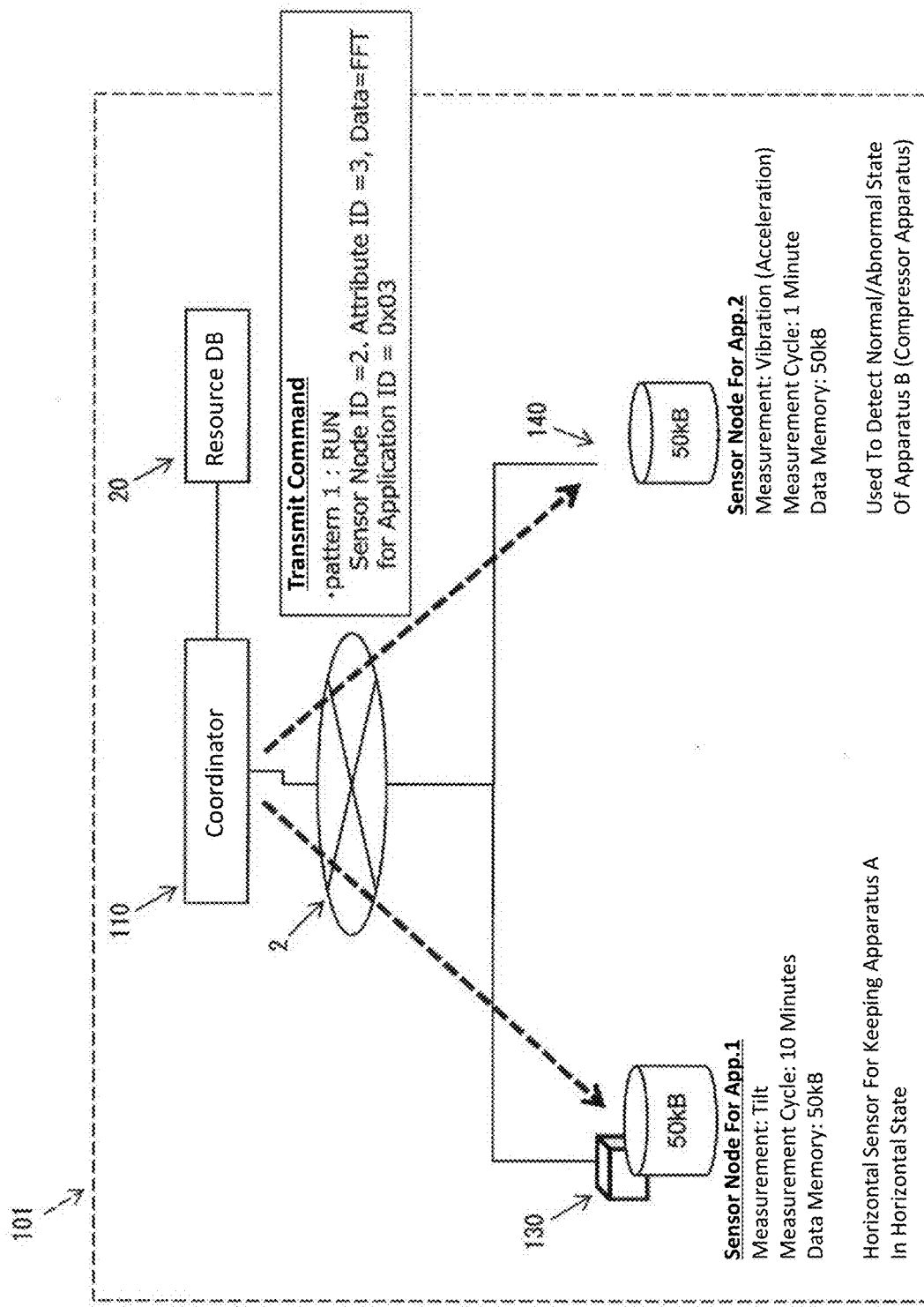
FIG. 26 is a block diagram showing a state where a command is transmitted to sensor nodes that are combined to satisfy a need input from outside, in the management system shown in FIG. 22.

Thus, to combine the resources included in the plurality of sensor nodes 130 and 140 to realize the need input by the user, the coordinator 110 generates a command and transmits the generated command to the sensor nodes 130 and 140, as shown in FIG. 26.

Here, the following command is transmitted to the sensor nodes 130 and 140 to request that the sensor node 140 provide the data processing function (FFT):
pattern 1: RUN
Sensor Node ID=2, Attribute ID=3, Data=FFT
for Application ID=0×03

Figure 27:
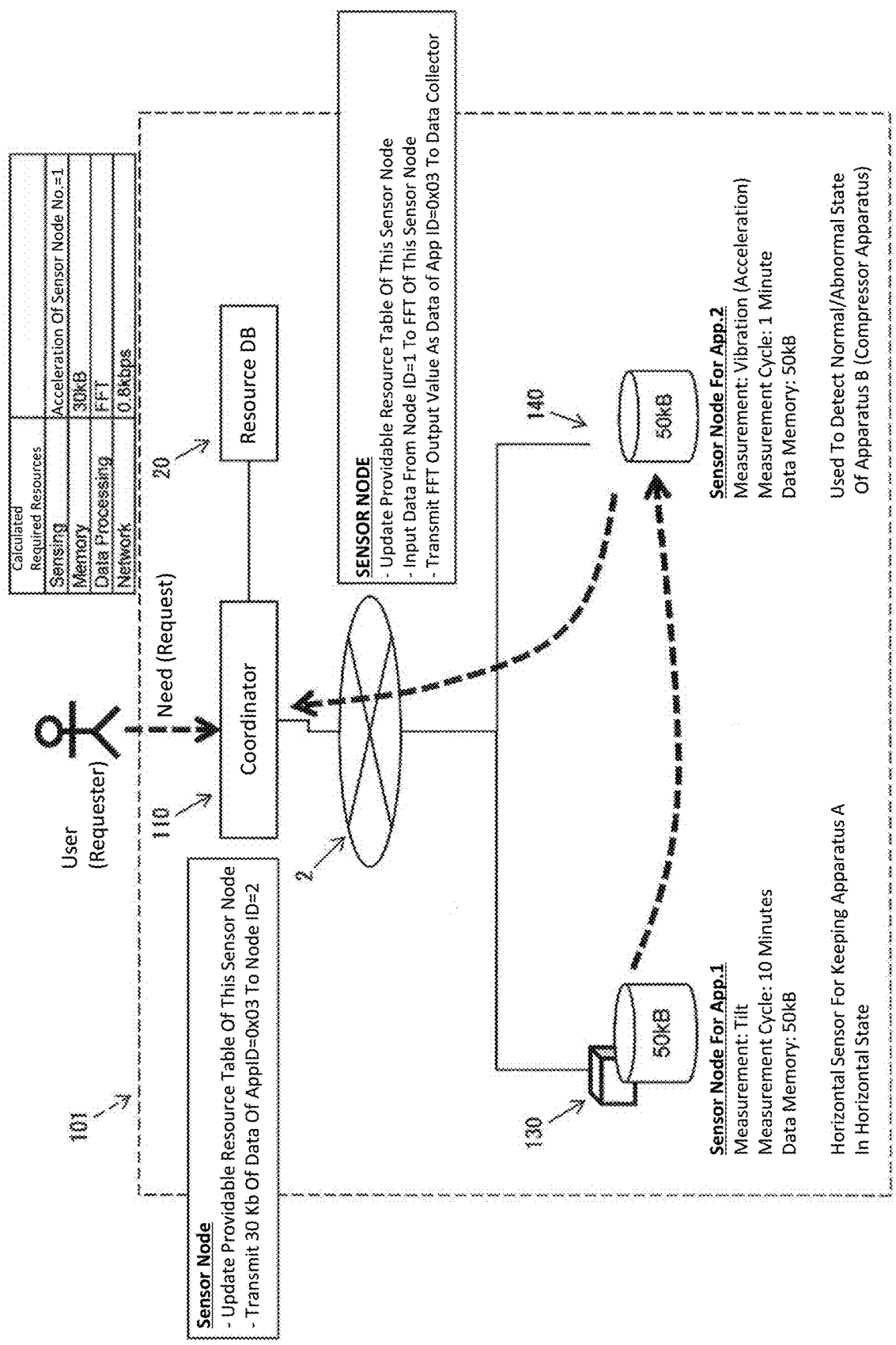
FIG. 27 is a block diagram showing a state where resources included in combined sensor nodes are lent to each other to satisfy a need input from outside, in the management system shown in FIG. 22.

In this example, the above-described management method realizes the need input by the user by combining the resources included in the plurality of sensor nodes 130 and 140 included in the management system 101, as shown in FIG. 27.

That is to say, the coordinator 110 calculates resources required for the need input by the user, as shown in FIG. 27.

The required resource information indicates an acceleration sensor, a memory of 30 kB, an FFT data processing function, and a 0.8-kbps network.

The coordinator 110 then references information regarding the resources included in the sensor nodes 130 and 140 that is stored in the resource DB 20, and calculates insufficient resource information, i.e. information regarding resources that will be insufficient with one sensor node 130 to realize the need.

In this example, insufficient resource information indicates the FFT data processing function.

Since the need cannot be realized only with the sensor node 130, the coordinator 110 references resource information, i.e. information regarding resources that can be provided by the other sensor node 140, and combines the resources included in the other sensor node 140 with the resources included in the sensor node 130.

As a result, the acceleration sensor and a memory of 30 kB, which are resources included in the sensor node 130, are provided, and the FFT data processing function, which is a resource included in the sensor node 140, is provided, as shown in FIG. 27.

Then, the sensor node 140 transmits a packet to the coordinator 110 so as to update the information regarding the resources that the sensor node 140 itself can provide.

Also, the sensor node 130 receives 30 kB of data of AppID=0×03 and thereafter transmits the data to the sensor node 140. Then, the sensor node 140 processes data, and transmits the processed data to the coordinator 110.

Thus, although the need input by the user cannot be realized only with the sensor node 130, the need can be readily realized by causing other sensor nodes 140 included in the management system 101 to provide a resource (FFT) that is not in use.

As a result, a variety of needs can be satisfied by using the resources included in the plurality of sensor nodes 130 while combining these resources, without setting a new sensor node.

OTHER EMBODIMENTS

Although an embodiment of the present invention has been described, the present invention is not limited to the above embodiment and may be modified in various manners without departing from the gist of the invention.

(A)

The above embodiment has described an example in which the coordinator 10 included in the management system 1 performs the management method according to the present invention, in accordance with the flowcharts shown in FIGS. 6 to 9. However, the present invention is not limited thereto.

For example, the management method performed in accordance with the flowcharts shown in FIGS. 6 to 9 may be provided as a management program to be executed by a computer to realize the present invention.

Alternatively, the present invention may be realized as a recording medium that stores the above-described program.

(B)

The above embodiment has described an example in which the resource DB 20 for storing information regarding resources included in the sensor nodes 30, 40, and 50 is provided outside the coordinator 10. However, the present invention is not limited thereto.

Figure 28:
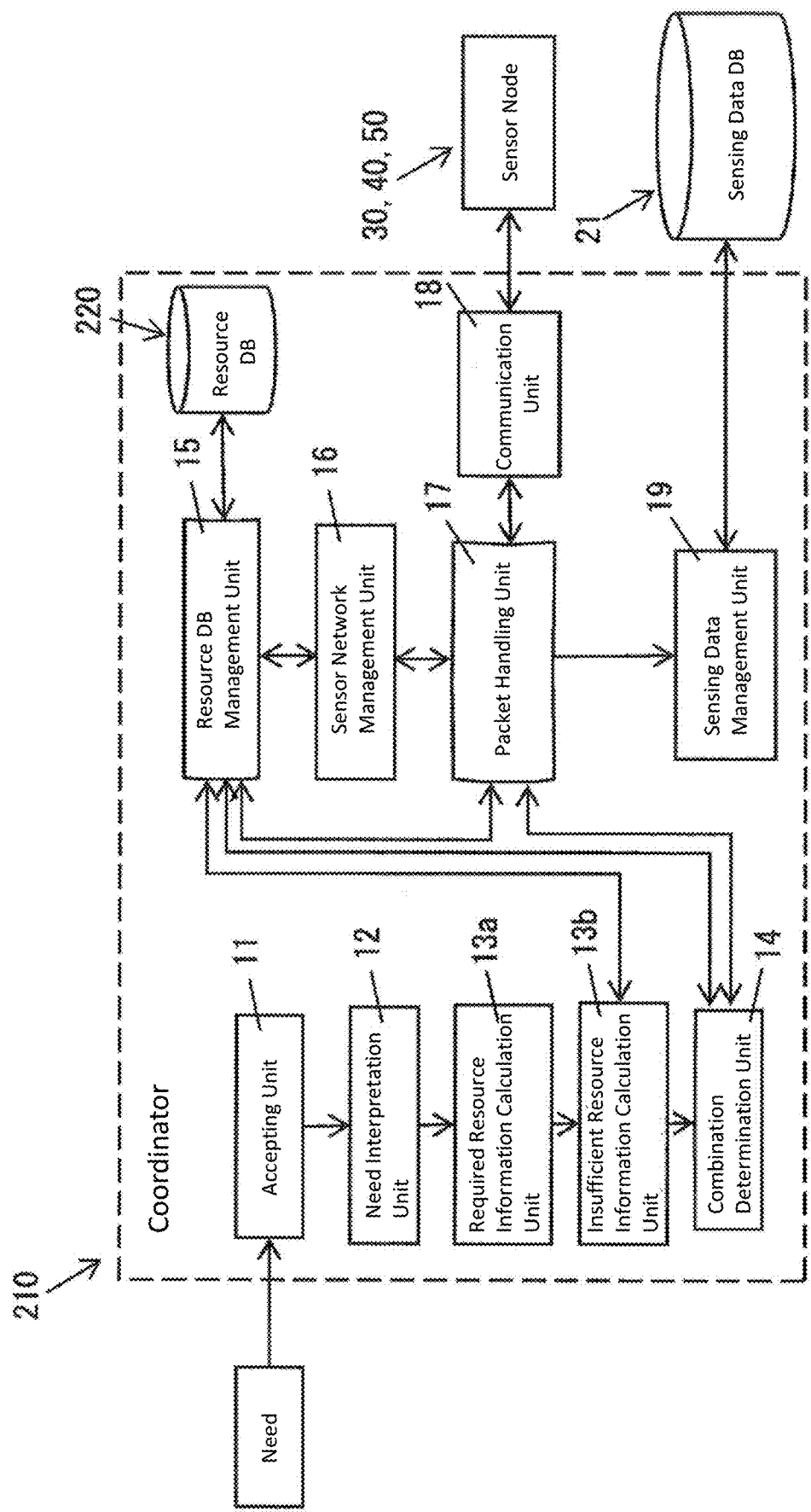
FIG. 28 is a block diagram showing a configuration of a coordinator according to another embodiment of the present invention.

For example, a resource DB (storage unit) 220 for storing resource information may be provided within a coordinator 210, as shown in FIG. 28.

(C)

The above embodiment has described, as an example, a configuration of the management system 1 in which the coordinator 10, which is connected to the three sensor nodes 30, 40, and 50 via the Internet 2, executes resources included in the sensor nodes 30, 40, and 50 while combining these resources. However, the present invention is not limited thereto.

For example, the number of sensor nodes included in the management system according to the present invention is not limited to three, and may alternatively be two as in Example 2 above, or may be four or more.

(D)

Example 1 above has described a power (power factor) sensor, a temperature/humidity sensor, an illuminance sensor, an acceleration (tilt) sensor, and a weight sensor as examples of sensors included in the sensor nodes 30, 40, and 50, as shown in FIG. 13. Example 2 above has described an acceleration (tilt) sensor and an acceleration (vibration) sensor as examples of sensors included in the sensor nodes 130 and 14, as shown in FIG. 22.

However, the present invention is not limited thereto.

For example, sensors included in the sensor nodes that constitute the management system according to the present invention may also be sensors for measuring physical quantities other than the above-listed sensors, and may be, for example, a voltage sensor, a current sensor, a motion sensor, a contact sensor, a pressure sensor, or the like.

Furthermore, as for the data processing function included in the sensor nodes, a data processing function other than the functions described in Examples 1 and 2 above may also be employed.

Also, as for the data communication function included in the sensor nodes, functions other than those described in Examples 1 and 2 above, such as wireless communication (ZigBee (registered trademark), Bluetooth (registered trademark) etc.) or an IP network, may also be employed.

(E)

The above embodiment has described an example in which the plurality of sensor nodes 30, 40, and 50 regularly transmit the latest information regarding resources included in the respective sensor nodes 30, 40, and 50 to the coordinator 10. However, the present invention is not limited thereto.

For example, if a change is made in the plurality of sensor nodes that constitute the management system, the resource information may be updated by the changed sensor node transmitting the content of change to the coordinator.

Alternatively, if a new sensor node is added to the management system, the resource information in the system may be updated by the added sensor node transmitting its own resource information to the coordinator.

Furthermore, if, for example, any of the existing sensor nodes that constitute the management system are removed from the system, the resource information in the system may be updated by the removed sensor node transmitting its own resource information to the coordinator.

In yet another embodiment, a method may be employed in which the coordinate transmits a command to the sensor nodes, with user input acting as a trigger, and the sensor nodes transmit, to the coordinator, information regarding resources that the sensor nodes can provide, in response to the command.

In this case, the latest information regarding resources included in the sensor nodes can be collected by the coordinator.

(F)

The above embodiment has described an example in which information regarding resources that the sensor nodes 30, 40, and 50 can provide for uses that differ from their original uses, is transmitted to and stored in the resource DB 20. However, the present invention is not limited thereto.

For example, information regarding all resources included in the sensor nodes may be transmitted to and stored in the resource DB.

In this case, it is favorable that the sensor nodes also transmit, for example, information regarding the schedule (time) of using the respective resources together. Thus, it is possible to recognize information regarding resources capable of being provided for other uses that may change depending on the time period.

(G)

The above embodiment has described an example in which the coordinator 10 satisfies a need input from outside, by combining resources that are provided for a use that differs from the original uses of the individual sensor nodes 30, 40, and 50. However, the present invention is not limited thereto.

For example, the resources that are included in the plurality of sensor nodes and are to be used in a combination may be used for the same uses as the original uses of the respective sensor nodes.

That is to say, even if the input need is for the same use as the original use of any of the plurality of sensor nodes, the need may not be able to be satisfied with performance of the individual sensor nodes. Then, even if the need is for the original use of a specific sensor, the need may be satisfied by combining resources included in the plurality of sensor nodes to complement performance of the specific sensor.

(H)

The above embodiment has described information that is directly input by a user, as an example of a need that is input to the coordinator 10 from outside. However, the present invention is not limited thereto.

For example, a need that is input from outside may be other than the information that is directly input by a user, and may be information that is input from an external apparatus, system, or the like.

(I)

The above embodiment has described an example in which the coordinator 10 acquires information regarding resources that can be provided by the plurality of sensor nodes 30, 40, and 50, and obtains a plurality of resource combinations to satisfy a need that is input from outside. However, the present invention is not limited thereto.

For example, the coordinator may obtain only one resource combination to satisfy the need.

Note that the present invention can also be expressed as follows.

(Note 1)

A management apparatus configured to satisfy a request input from outside by causing resources included in a plurality of sensor nodes to be provided for the request, the management apparatus including a memory and at least one processor connected to the memory, wherein the processor is configured to accept the request;

acquire information regarding the resources included in the plurality of sensor nodes;

calculate information regarding resources required to satisfy the request;

compare the required resources with resources included in each of the plurality of sensor nodes, and calculate information regarding insufficient resources that each of the sensor nodes lacks;

determine a combination of resources required to satisfy the request, based on the information regarding the insufficient resources; and transmit a command to cause a plurality of sensor nodes that include the required resources to provide the required resources, based on the determined combination.

(Note 2)

A management method including:

a step of accepting the request, by at least one processor;

a step of acquiring information regarding resources included in a plurality of sensor nodes, by at least one processor;

a step of obtaining information regarding resources required to satisfy the request accepted in the accepting step, by at least one processor;

a step of comparing the required resources obtained in the required resource information calculation step with resources included in each of the plurality of sensor nodes, and obtaining information regarding insufficient resources that each of the sensor nodes lacks, by at least one processor;

a step of determining a combination of resources required to satisfy the request, based on the information regarding the insufficient resources calculated in the insufficient resource information calculation step, by at least one processor; and a step of transmitting a command to cause a plurality of sensor nodes that include the required resources to provide the required resources, based on the combination determined in the combination determination step, by at least one processor.

INDUSTRIAL APPLICABILITY

The management apparatus according to the present invention has an effect of enabling various needs to be satisfied by combining resources included in a plurality of sensor nodes, and is thus widely applicable to various systems or the like that include a plurality of sensor nodes.

LIST OF REFERENCE NUMERALS

1 Management system
2 Network
10 Coordinator (management apparatus)
11 Accepting unit
12 Need interpretation unit
13a Required resource information calculation unit
13b Insufficient resource information calculation unit
14 Combination determination unit
15 Resource DB management unit
16 Sensor network management unit
17 Packet handling unit
18 Communication unit (resource information acquisition unit, communication unit)
19 Sensing data management unit
20 Resource DB (database) (storage unit)
21 Sensing data DB
30 Sensor node
31 Communication unit
32 Packet handling unit
33 Resource distribution control unit
34 Resource management table
35 Task management unit
36 Data holding unit
37 Measurement unit
38 Data processing unit
40 Sensor node
50 Sensor node
101 Management system
110 Coordinator (management apparatus)
130 Sensor node
140 Sensor node
210 Coordinator
220 Resource DB (database) (storage unit)

The invention claimed is:

1. A management apparatus configured to satisfy a request input from outside by causing individual resources included in each of a plurality of sensor nodes to be provided for satisfying the request, the individual resources comprising one or more of hardware resources, software resources, and capabilities of each of the plurality of sensor nodes, the management apparatus comprising a memory and at least one processor connected to the memory, wherein the processor is configured to accept the request;

acquire information regarding the individual resources included in each of the plurality of sensor nodes;

calculate information regarding required resources required to satisfy the request;

compare the calculated information regarding the required resources required to satisfy the request with the acquired information regarding the individual resources included in each of the plurality of sensor nodes, and calculate information regarding one or more of the required resources that each of the sensor nodes lacks for satisfying the request;

determine a combination of the individual resources of the plurality of sensor nodes to meet the required resources required to satisfy the request, based on the acquired information regarding the individual resources included in each of the plurality of sensor nodes, and the calculated information regarding the one or more of the required resources that each of the sensor nodes lacks for satisfying the request, the combination of the individual resources of the plurality of sensor nodes is selected with priority given to at least one of a combination having a lower availability of resources and a combination having a higher communication speed between sensor nodes; and transmit a command to cause ones of the plurality of sensor nodes that include the determined combination of the individual resources that meet the required resources required to satisfy the request, to provide the required resources, based on the determining of the combination.

2. The management apparatus according to claim 1, wherein
the memory includes a storage unit configured to store information regarding the request and the information regarding the individual resources included in each of the plurality of sensor nodes.

3. The management apparatus according to claim 1, wherein the processor is configured to regularly acquire latest resource information from the plurality of sensor nodes.

4. The management apparatus according to claim 1, wherein the information regarding the individual resources included in each of the plurality of sensor nodes includes at least one of a type, a storage, capacity of a memory, data processing capability, a communication method, communication performance, and power supply information of a sensor included in each sensor node.

5. The management apparatus according to claim 1, wherein the processor is configured to calculate a plurality of combinations of resources required to satisfy the request.

6. The management apparatus according to claim 5, wherein the processor is configured to determine the combination of the resources included in the command, from the plurality of calculated combinations of the resources required to satisfy the request, based on at least one of availability of the resources, the number of resources required in the combination, and a communication speed between the sensor nodes.

7. The management apparatus according to claim 1, wherein the processor is configured to calculate information regarding at least one of a type, capacity, performance, and time of the required resources.

8. A management system comprising:
the management apparatus according to claim 1; and
the plurality of sensor nodes.

9. The management system according to claim 8, wherein the memory includes a storage unit configured to store the information regarding the resources.

10. A management method for satisfying a request input from outside by causing individual resources included in each of a plurality of sensor nodes to be provided for satisfying the request, the individual resources comprising one or more of hardware resources, software resources, and capabilities of each of the plurality of sensor nodes, the management method comprising:
accepting the request, by at least one processor;
acquiring information regarding the individual resources included in each of the plurality of sensor nodes, by at least one processor;
calculating information regarding required resources required to satisfy the accepted request, by at least one processor;
comparing the calculated information regarding the required resources required to satisfy the request with the acquired information regarding the individual resources included in each of the plurality of sensor nodes, and calculating information regarding one or more of the required resources that each of the sensor nodes lacks for satisfying the request, by at least one processor;
determining a combination of the individual resources of the plurality of sensor nodes to meet the required resources required to satisfy the request, based on the acquired information regarding the individual resources included in each of the plurality of sensor nodes, and the calculated information regarding the one or more of the required resources that each of the sensor nodes lacks for satisfying the request, by at least one processor, the combination of the individual resources of the plurality of sensor nodes is selected with priority given to further determined based on at least one of a combination having a lower availability of resources and a combination having a higher communication speed between sensor nodes; and
transmitting a command to cause ones of the plurality of sensor nodes that include the determined combination of the individual resources that meet the required resources required to satisfy the request, to provide the required resources, based on the determining the combination, by at least one processor.

11. A non-transitory computer readable medium storing a management program for satisfying a request input from outside by causing individual resources included in each of a plurality of sensor nodes to be provided for satisfying the request, the individual resources comprising one or more of hardware resources, software resources, and capabilities of each of the plurality of sensor nodes, the management program for causing a computer to perform a management method comprising:
accepting the request;
acquiring information regarding the individual resources included in each of the plurality of sensor nodes;
calculating information regarding required resources required to satisfy the accepted request;
comparing the calculated information regarding the required resources required to satisfy the request with the acquired information regarding the individual resources included in each of the plurality of sensor nodes, and calculating information regarding one or more of the required resources that each of the sensor nodes lacks for satisfying the request;
determining a combination of the individual resources of the plurality of sensor nodes to meet the required resources required to satisfy the request, based on the acquired information regarding the individual resources included in each of the plurality of sensor nodes, and the calculated information regarding the one or more of the required resources that each of the sensor nodes lacks for satisfying the request, the combination of the individual resources of the plurality of sensor nodes is selected with priority given to at least one of a combination having a lower availability of resources and a combination having a higher communication speed between sensor nodes; and
transmitting a command to cause ones of the plurality of sensor nodes that include the determined combination of the individual resources that meet the required resources required to satisfy the request, to provide the required resources, based on the determining the combination.

12. The management apparatus according to claim 2, wherein the processor is configured to regularly acquire latest resource information from the plurality of sensor nodes.

13. The management apparatus according to claim 2, wherein the information regarding the individual resources included in each of the plurality of sensor nodes includes at least one of a type, a storage, capacity of a memory, data processing capability, a communication method, communication performance, and power supply information of a sensor included in each sensor node.

14. The management apparatus according to claim 3, wherein the information regarding the individual resources included in each of the plurality of sensor nodes includes at least one of a type, a storage, capacity of a memory, data processing capability, a communication method, communication performance, and power supply information of a sensor included in each sensor node.

15. The management apparatus according to claim 2, wherein the processor is configured to calculate a plurality of combinations of resources required to satisfy the request.

16. The management apparatus according to claim 3, wherein the processor is configured to calculate a plurality of combinations of resources required to satisfy the request.

17. The management apparatus according to claim 4, wherein the processor is configured to calculate a plurality of combinations of resources required to satisfy the request.

18. The management apparatus according to claim 15, wherein the processor is configured to determine the combination of the resources included in the command, from the plurality of calculated combinations of the resources required to satisfy the request, based on at least one of availability of the resources, the number of resources required in the combination, and a communication speed between the sensor nodes.

19. The management apparatus according to claim 16, wherein the processor is configured to determine the combination of the resources included in the command, from the plurality of calculated combinations of the resources required to satisfy the request, based on at least one of availability of the resources, the number of resources required in the combination, and a communication speed between the sensor nodes.

20. The management apparatus according to claim 17, wherein the processor is configured to determine the combination of the resources included in the command, from the plurality of calculated combinations of the resources required to satisfy the request, based on at least one of availability of the resources, the number of resources required in the combination, and a communication speed between the sensor nodes.

* * * * *